(12) United States Patent
Miyamoto et al.

(10) Patent No.: US 10,516,300 B2
(45) Date of Patent: Dec. 24, 2019

(54) POWER RECEIVING UNIT, POWER RECEIVING CONTROL METHOD, FEED SYSTEM, AND ELECTRONIC APPARATUS

(71) Applicant: Sony Corporation, Tokyo (JP)

(72) Inventors: Takashi Miyamoto, Kanagawa (JP); Kuniya Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/890,754

(22) Filed: Feb. 7, 2018

(65) Prior Publication Data

US 2018/0166923 A1 Jun. 14, 2018

Related U.S. Application Data

(63) Continuation of application No. 14/487,701, filed on Sep. 16, 2014, now Pat. No. 9,929,602.

(30) Foreign Application Priority Data

Oct. 15, 2013 (JP) .................. 2013-214931

(51) Int. Cl.
*H02J 50/12* (2016.01)
*H02J 50/80* (2016.01)
*H02J 50/40* (2016.01)
*H02J 50/60* (2016.01)
*H02J 50/70* (2016.01)

(52) U.S. Cl.
CPC ............. *H02J 50/12* (2016.02); *H02J 50/40* (2016.02); *H02J 50/60* (2016.02); *H02J 50/70* (2016.02); *H02J 50/80* (2016.02)

(58) Field of Classification Search
CPC ....................................... H02J 50/12
USPC ........................................ 307/104
See application file for complete search history.

(56) References Cited

U.S. PATENT DOCUMENTS

| 8,262,244 | B2 | 9/2012 | Metcalf et al. |
| 8,487,481 | B2 | 7/2013 | Cook et al. |
| 9,929,602 | B2 * | 3/2018 | Miyamoto ............. H02J 5/005 |
| 2015/0091510 | A1 | 4/2015 | Iwawaki et al. |

FOREIGN PATENT DOCUMENTS

| CN | 202888976 U | 4/2013 |
| JP | 2009-240099 A | 10/2009 |
| JP | 2012-085426 | 4/2012 |

(Continued)

OTHER PUBLICATIONS

Chinese Office Action dated Jan. 2, 2018 for corresponding Chinese Application No. 201410524285.9.

(Continued)

*Primary Examiner* — Joseph Chang
(74) *Attorney, Agent, or Firm* — Michael Best & Friedrich LLP

(57) ABSTRACT

A power receiving unit includes: a power generation section configured to generate DC power based on a power signal wirelessly supplied from a power feeding unit; a load connection section configured to turn on or off supply of the DC power to a load; and a control section configured to control feed power of the power signal, and to turn on the load connection section when the power signal satisfies a variable reference condition.

18 Claims, 19 Drawing Sheets

(56) References Cited

FOREIGN PATENT DOCUMENTS

| JP | 2013-102664 | 5/2013 |
|---|---|---|
| WO | WO-2013/136464 A1 | 9/2013 |

OTHER PUBLICATIONS

Japanese Office Action dated Oct. 18, 2016 for corresponding Japanese Application No. 2013-214931.
Chinese Office Action dated Aug. 20, 2018 for corresponding Chinese Application No. 201410524285.9.

* cited by examiner

POWER RECEIVING UNIT, POWER RECEIVING CONTROL METHOD, FEED SYSTEM, AND ELECTRONIC APPARATUS

CROSS REFERENCE TO RELATED APPLICATIONS

This application is a Continuation of application Ser. No. 14/487,701, filed Sep. 16, 2014, and claims the benefit of Japanese Priority Patent Application JP 2013-214931 filed Oct. 15, 2013, the entire contents of which are incorporated herein by reference.

BACKGROUND

The present disclosure relates to a power receiving unit that wirelessly receives power from a power feeding unit, a power receiving control method used in such a power receiving unit, and a feed system and an electronic apparatus that use such a power receiving unit.

In recent years, a feed system performing wireless power feeding (also called wireless power transfer, contact free, or non-contact power feeding) on consumer electronics devices (CE devices) such as mobile phones and portable music players has attracted attention. In such a feed system, for example, a mobile phone (a power receiving unit) may be charged when the mobile phone is placed on a feeding tray (a power feeding unit). In other words, in such a feed system, the power feeding is allowed to be performed without connecting the power feeding unit and the power receiving unit by a cable or the like.

Examples of the method of performing such wireless power feeding may include, for example, an electromagnetic induction method and a magnetic field resonance method (also called magnetic resonance method) using resonance phenomenon. In these methods, power is transmitted with use of magnetic coupling between a power feeding coil of a power feeding unit and a power receiving coil of a power receiving unit. Among them, as compared with the electromagnetic induction method, advantageously, the magnetic field resonance method is allowed to transmit power even if the power feeding unit and the power receiving unit are away from each other, and feeding efficiency in the magnetic field resonance method does not particularly drop even if positioning between the power feeding unit and the power receiving unit is insufficient.

In such a feed system, power is supplied from the power feeding unit to the power receiving unit frequently depending on a load state as viewed from the power receiving unit. For example, in Japanese Unexamined Patent Application Publication No. 2012-085426, a power feeding unit and a feed system that perform power transmission with use of a magnetic field are disclosed. The power feeding unit and the feed system devise proper power supply corresponding to various loads. Moreover, for example, in Japanese Unexamined Patent Application Publication No. 2013-102664, a power feeding unit and a feed system that perform power transmission with use of a magnetic field or an electric field are disclosed. The power feeding unit and the feed system devise proper control irrespective of a load state.

SUMMARY

Incidentally, a power receiving unit desirably starts power feeding without causing malfunction when starting the power feeding to a load.

It is desirable to provide a power receiving unit, a power receiving control method, a feed system, and an electronic apparatus that are capable of starting power feeding to a load while reducing possibility of malfunction.

According to an embodiment of the disclosure, there is provided a power receiving unit including: a power generation section configured to generate DC power based on a power signal wirelessly supplied from a power feeding unit; a load connection section configured to turn on or off supply of the DC power to a load; and a control section configured to control feed power of the power signal, and to turn on the load connection section when the power signal satisfies a variable reference condition.

According to an embodiment of the disclosure, there is provided a power receiving control method including: generating a DC power based on a power signal wirelessly supplied from a power feeding unit; and controlling feed power of the power signal and turning on supply of the DC power to a load when the power signal satisfies a variable reference condition.

According to an embodiment of the disclosure, there is provided a feed system provided with a power feeding unit and a power receiving unit. The power receiving unit includes: a power generation section configured to generate DC power based on a power signal wirelessly supplied from the power feeding unit; a load connection section configured to turn on or off supply of the DC power to a load; and a control section configured to control feed power of the power signal, and to turn on the load connection section when the power signal satisfies a variable reference condition.

According to an embodiment of the disclosure, there is provided an electronic apparatus including: a power generation section configured to generate DC power based on a power signal wirelessly supplied from a power feeding unit; a load configured to operate based on the DC power; a load connection section configured to turn on or off supply of the DC power to the load; and a control section configured to control feed power of the power signal, and to turn on the load connection section when the power signal satisfies a variable reference condition.

In the power receiving unit, the power receiving control method, the feed system, and the electronic apparatus according to the respective embodiments of the disclosure, the DC power is generated based on the power signal, and the supply of the DC power to the load is controlled to be on or off. At this time, when the power signal satisfies the variable reference condition, the DC power is supplied to the load.

According to the power receiving unit, the power receiving control method, the feed system, and the electronic apparatus according to the respective embodiments of the disclosure, the load connection section is turned on when the power signal satisfies the variable reference condition. Therefore, it is possible to start power feeding to the load while reducing possibility of malfunction. Note that effects of embodiments of the present disclosure are not limited to this effect, and may include any of effects that will be described in the present disclosure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, preferred embodiments of the disclosure will be described in detail with reference to drawings. Note that description will be given in the following order.

1. First Embodiment
2. Second Embodiment

1. First Embodiment

Configuration Example

Figure 1:
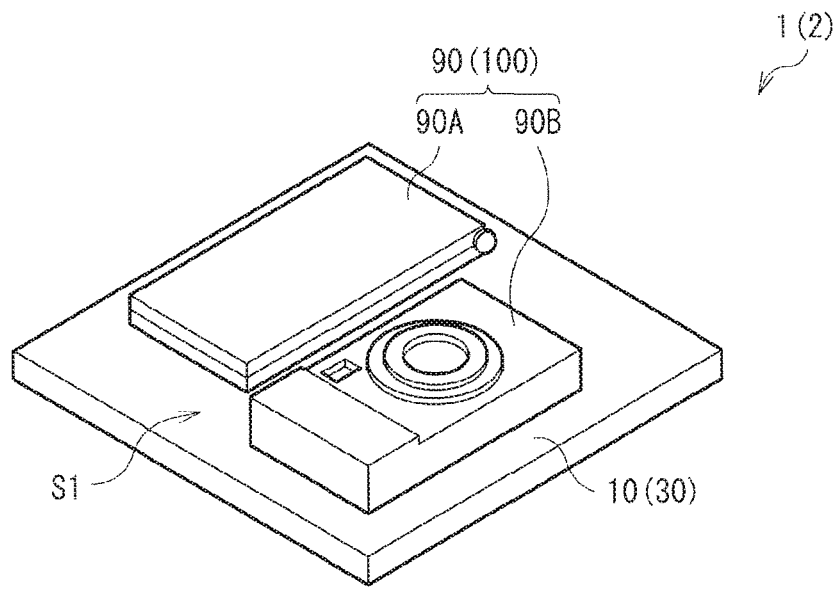
FIG. 1 is a perspective view illustrating a configuration example of a feed system according to embodiments of the disclosure.

FIG. 1 illustrates a configuration example of a feed system according to a first embodiment. A feed system 1 is a feed system wirelessly supplying power. Note that a power receiving unit, a power receiving control method, and an electronic apparatus according to respective embodiments of the disclosure are embodied by the present embodiment, and thus are described together.

The feed system 1 includes a power feeding unit 10 and an electronic apparatus 90 (electronic apparatuses 90A and 90B in this example). The power feeding unit 10 is a tray-type power feeding unit in this example, and when the electronic apparatus 90 is placed on a power feeding surface S1 of the power feeding unit 10, the power feeding unit 10 feeds power to a power receiving unit 20 (described later) incorporated in each of the electronic apparatuses 90 at a time or in a time-divisional manner (sequentially) to charge a secondary battery 82 (described later) incorporated in each of the electronic apparatuses 90.

A power feeding coil 14 (not illustrated) described later is disposed on the power feeding surface S1 (on a side in contact with the electronic apparatus 90) of the power feeding unit 10, and a power receiving coil 21 (not illustrated) described later is disposed on a power receiving surface (on a side in contact with the power feeding unit 10) of the electronic apparatus 90. The power feeding unit 10 transmits power to the electronic apparatus 90 with use of magnetic coupling through the power feeding coil 14 and the power receiving coil 21. At this time, the power receiving unit 20 in each of the electronic apparatuses 90 communicates with the power feeding unit 10 by so-called load modulation to instruct the power feeding unit 10 to increase or decrease feed power. Accordingly, a user is allowed to charge the secondary battery 82 (described later) without directly connecting AC (alternating current) adapter or the like to the electronic apparatus 90, which makes it possible to enhance convenience for the user.

In this example, the feed system 1 performs power feeding on the two electronic apparatuses 90A and 90B. Incidentally, in this example, the electronic apparatus 90 is a mobile phone, and the electronic apparatus 90B is a digital camera; however, this is not limitative. For example, various portable terminal devices such as a video camera, a smartphone, a mobile battery, a personal computer, a tablet, a phablet, an electronic book reader, an audio player, an audio recorder, a speaker, a headphone, a head-mounted display, an accessory, a game machine, a wearable appliance, a glasses-type device, a wrist-mounted device, and a medical instrument may be used. The power feeding surface S1 may desirably have a wide surface so that the power feeding unit 10 feeds the plurality of electronic apparatuses 90 with power in this way. Specifically, an area of the power feeding surface S1 of the power feeding unit 10 may be desirably larger than an area of a power receiving surface of each of the electronic apparatuses 90. Note that this is not limitative, and for example, the area of the power feeding surface S1 may be equivalent to the area of the power receiving surface of each of the electronic apparatuses 90, or may be smaller than the area of the power receiving surface of each of the electronic apparatuses 90.

In this example, although the power feeding unit 10 has a tray shape, the shape is not limited thereto, and alternatively, for example, the power feeding unit 10 may have a trapezoidal shape, or a mat shape. Moreover, in this example, the electronic apparatus 90 is placed on the power feeding surface S1 of the power feeding unit 10; however, this is not limitative. In other words, the power feeding through magnetic coupling is allowed to be performed by not only contact but also proximity. Therefore, the power feeding unit 10 is not limited to the case having a flat surface such as the power feeding surface S1. Specifically, for example, the power feeding unit 10 may be a stand-type power feeding unit such as a tabletop holder and a cradle. Moreover, the power feeding unit 10 may be a housing-type power feeding unit that houses the electronic apparatus 90 therein and feeds the electronic apparatus 90 with power, such as furniture, a bag, a box, and a pouch.

In addition, the power feeding unit 10 may have a configuration in which a plurality of power feeding units or various kinds of power feeding units are integrated. Moreover, the power feeding unit 10 may be configured to be incorporated in other electronic apparatuses or electric appliances, or may be configured so as to be embedded in a wall, a floor, or the like. Furthermore, the electronic apparatus 90 may be configured to have a function similar to that of the power feeding unit 10 in addition to the power receiving unit 20, and to feed other power receiving units with power.

Incidentally, in this example, the feed system 1 feeds the two electronic apparatuses 90A and 90B with power; however, the number of electronic apparatuses is not limited thereto. Alternatively, the feed system 1 may feed one or three or more electronic apparatuses 90 with power.

Figure 2:
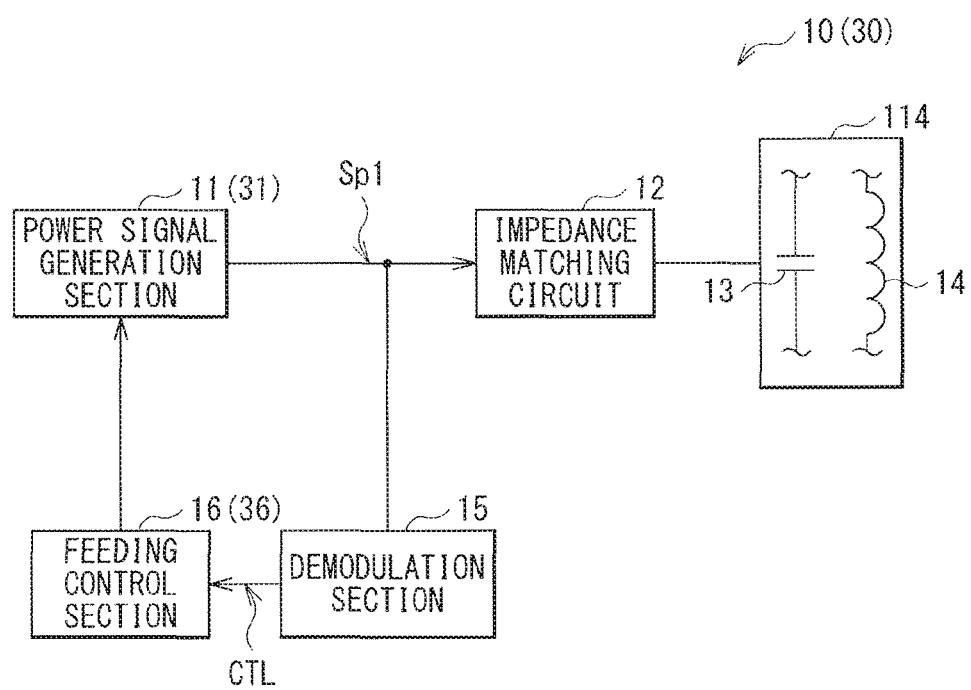
FIG. 2 is a block diagram illustrating a configuration example of a power feeding unit illustrated in FIG. 1.

FIG. 2 illustrates a configuration example of the power feeding unit 10. The power feeding unit 10 includes a power signal generation section 11, an impedance matching circuit 12, a power feeding coil section 114, a demodulation section 15, and a feeding control section 16.

The power signal generation section 11 generates an AC power signal Sp1 based on instruction from the feeding control section 16. The power signal generation section 11 is supplied with AC power through a plug and a socket (so-called outlet), or is supplied with AC power or DC power from the other power source unit, to generate the power signal Sp1. At this time, the power signal generation section 11 is allowed to change a frequency fp of the power signal Sp1 based on the instruction from the feeding control section 16. Incidentally, examples of the other power source units may include various external power source units, and an internal power source unit using a battery or the like. Moreover, a power source unit using natural energy (renewable energy) such as sunlight and wind power may be used.

The impedance matching circuit 12 matches impedance of the power feeding unit 10 with impedance of the power receiving unit 20 (described later) of the electronic apparatus 90. A first end of the impedance matching circuit 12 is supplied with the power signal Sp1, and a second end thereof is connected to the power feeding coil section 114. In the feed system 1, the impedance matching is performed in such a way so that power feeding efficiency from the power feeding unit 10 to the power receiving unit 20 is allowed to be enhanced. As the impedance matching circuit 12, a circuit having a fixed circuit constant may be used, or a circuit that includes a variable element such as a variable capacitor and has a variable circuit constant may be used. Incidentally, the impedance matching circuit 12 is provided in this example; however, this is not limitative. In the case where high power feeding efficiency is achievable without providing the impedance matching circuit 12, the impedance matching circuit 12 may be omitted.

The power feeding coil section 114 performs power feeding on the power receiving unit 20 of the electronic apparatus 90. The power feeding coil section 114 includes a capacitor 13 and a power feeding coil 14, and the capacitor 13 and the power feeding coil 14 configure an LC resonance circuit. The power feeding coil section 114 is connected to the second end of the impedance matching circuit 12, and is supplied with the power signal Sp1 from the power signal generation section 11 through the impedance matching circuit 12. Further, the power feeding coil 14 generates an electromagnetic field in accordance with Ampere's law based on the power signal Sp1. In the feed system 1, the power feeding unit 10 performs power feeding on the power receiving unit 20 of the electronic apparatus 90 through the electromagnetic field.

As the power feeding coil 14, for example, a coil formed by winding a conductive wire rod may be used. In this case, as a wire rod, for example, a wire rod formed of a plurality of bundled conductive strands may be used. Specifically, a coil using a wire rod formed of bundled two conductive strands, namely, a bifilar wound coil, or a coil using a wire rod formed of bundled three conductive strands, namely, a trifilar wound coil may be used. Moreover, a wire rod (so-called litz wire) that is formed by bundling and laying a plurality of conductive strands may be used.

Moreover, in addition to the coil formed by winding the conductive wire rod, for example, a so-called pattern coil or a pattern loop that is formed by arranging a conductive pattern on a printed-wiring board or a flexible printed circuit board may be used. The pattern coil and the like may be formed by printing or evaporating a conductive material on a substrate, or arranging a conductive plate, a conductive sheet, or the like on a substrate.

In addition, for example, as the power feeding coil 14, a spiral-shape coil or a helical-shape coil configured by winding a wire in a thickness direction thereof may be used. Further, the power feeding coil 14 may be configured using an alpha-wound shape configured by folding a spiral coil into two layers, or a multilayer spiral shape.

Note that a shield formed of a magnetic material, a conductive material, or the like may be provided around the power feeding coil 14 in order to prevent leakage of magnetic flux. In this case, the configuration of the shield is devised to improve the power feeding efficiency. Moreover, a magnet may be provided around the power feeding coil 14 in order to facilitate positioning between the power feeding unit 10 and the electronic apparatus 90.

For example, in the power feeding coil section 114, the capacitor 13 and the power feeding coil 14 may be connected in series to each other to configure the LC resonance circuit. In the feed system 1, the capacitance value of the capacitor 13 and the inductance value of the power feeding coil 14 are designed so that a resonance frequency f1 of the LC resonance circuit is substantially equal to or close to a resonance frequency f2 of the LC resonance circuit in the power receiving unit 20 (described later) of the electronic apparatus 90. Moreover, for example, the capacitance value of the capacitor 13 may be configured to be variable with use of a variable capacitor. In this case, the resonance frequency f1 is allowed to be adjusted.

Note that the configuration of the power feeding coil section 114 is not limited to the configuration in which the capacitor 13 and the power feeding coil 14 are connected in series to each other in this way, and may be a configuration in which the capacitor 13 and the power feeding coil 14 are connected in parallel to each other, or may be a configuration in which other element is added and series connection and parallel connection are combined. Moreover, the capacitor 13 is provided in this example; however, this is not limitative, and for example, the capacitor 13 may be omitted. Specifically, for example, the capacitor 13 may be omitted in the case where the desired resonance frequency f1 is obtainable by an inter-wire capacitance (a parasitic capacitance) of the power feeding coil 14, a capacitance between the power feeding coil 14 and the power receiving coil 21 (described later), or the like without providing the capacitor 13. Moreover, the capacitor 13 may also be omitted in the case where high power feeding efficiency is achievable without providing the capacitor 13. Incidentally, one power feeding coil 14 is provided in this example; however, the number of the power feeding coil 14 is not limited thereto. For example, a plurality of power feeding coils 14 may be provided, and one or more power feeding coils 14 to be used may be selected from among them.

In addition, the LC resonance circuit is configured using the capacitor 13 and the power feeding coil 14 in this example. However, this is not limitative, and other elements may be further added, or other resonance circuit may be further added.

The demodulation section 15 demodulates the feeding control signal CTL that is transmitted by the power feeding unit 20 (described later) of the electronic apparatus 90 through so-called load modulation when the power feeding unit 10 performs the power feeding on the electronic apparatus 90. The feeding control signal CTL includes information necessary for the power feeding operation, such as increase request, decrease request, or the like of the feed power from the power receiving unit 20 to the power feeding unit 10. An input terminal of the demodulation section 15 is connected to the first end of the impedance matching circuit 12 or the like, and the demodulation section 15 is supplied with the feeding control signal CTL superimposed on the power signal Sp1. The demodulation section 15 extracts the feeding control signal CTL from this signal, and supplies the feeding control signal CTL to the feeding control section 16.

The feeding control section 16 controls the feeding operation of the power feeding unit 10 based on the feeding control signal CTL. Specifically, the feeding control section 16 controls the power signal generation section 11 based on the feeding control signal CTL, and controls the feed power from the power feeding unit 10 to the power receiving unit 20 (described later) of the electronic apparatus 90. At this time, the feeding control section 16 controls the frequency fp of the power signal Sp1 that is generated by the power signal generation section 11, and changes the power feeding efficiency from the power feeding unit 10 to the power receiving unit 20 to control the feed power.

Figure 3:
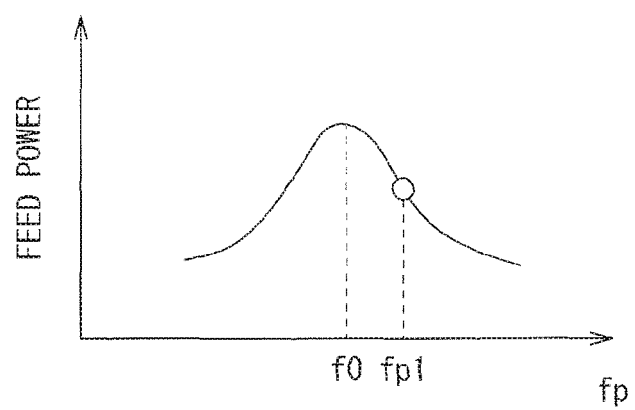
FIG. 3 is an explanatory diagram for explaining feed power in the feed system illustrated in FIG. 1.

FIG. 3 illustrates an example of the feed power in the feed system 1. A lateral axis indicates the frequency fp of the power signal Sp1, and a vertical axis indicates the feed power from the power feeding unit 10 to the power receiving unit 20. In this example, the feed power is designed so as to be the highest at a frequency f0, and the power signal generation section 11 generates the power signal Sp1 of the frequency fp (for example, a frequency fp1) larger than the frequency f0 in this example. For example, when the increase request of the feed power is given from the power receiving unit 20, the feeding control section 16 controls the power signal generation section 11 so that the frequency fp of the power signal Sp1 is decreased. As a result, in the feed system 1, the feed power from the power feeding unit 10 to the power receiving unit 20 is increased as illustrated in FIG. 3. Moreover, for example, when the decrease request of the feed power is given from the power receiving unit 20, the feeding control section 16 controls the power signal generation section 11 so that the frequency fp of the power signal Sp1 is increased. Accordingly, in the feed system 1, the feed power from the power feeding unit 10 to the power receiving unit 20 is decreased as illustrated in FIG. 3.

Figure 4:
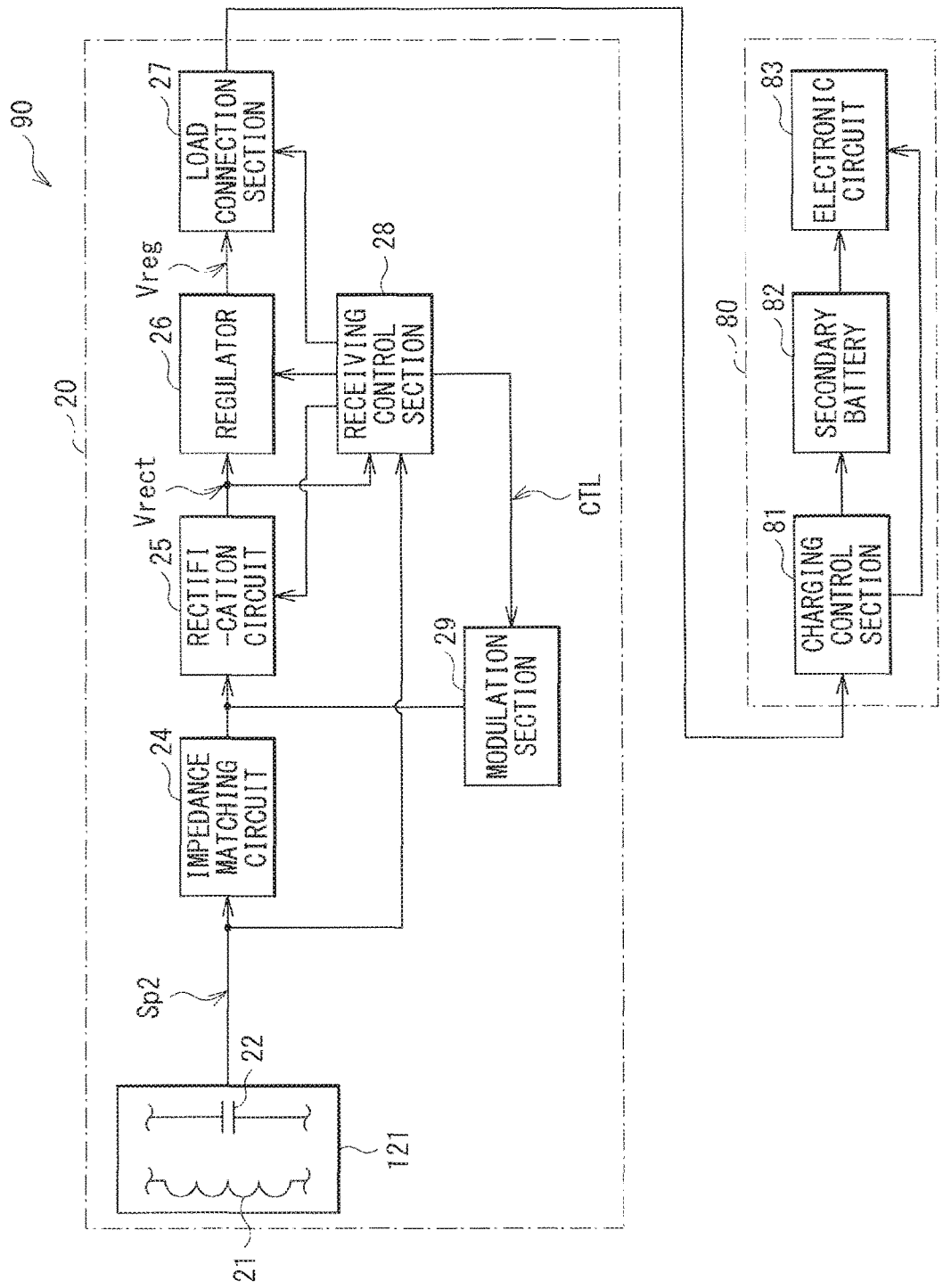
FIG. 4 is a block diagram illustrating a configuration example of a power receiving unit according to a first embodiment.

FIG. 4 illustrates a configuration example of the electronic apparatus 90. The electronic apparatus 90 includes the power receiving unit 20 and a load 80. The power receiving unit 20 includes a power receiving coil section 121, an impedance matching circuit 24, a rectification circuit 25, a regulator 26, a load connection section 27, a receiving control section 28, and a modulation section 29. The load 80 includes a charging control section 81, a secondary battery 82, and an electronic circuit 83.

The power receiving coil section 121 receives power from the power feeding unit 10. The power receiving coil section 121 includes the power receiving coil 21 and a capacitor 22, and the power receiving coil 21 and the capacitor 22 configure an LC resonance circuit. The power receiving coil 21 generates an induction voltage according to the change of the magnetic flux based on law of the electromagnetic induction based on the electromagnetic field generated by the power feeding coil 14 of the power feeding unit 10. Although one power receiving coil 21 is provided in this example, the number of the power receiving coil 21 is not limited thereto. For example, a plurality of power receiving coils 21 may be provided, and one or more power receiving coils 21 to be used may be selected from among them.

As the power receiving coil 21, similarly to the power feeding coil 14 of the power feeding unit 10, coils with various configurations may be used. Specifically, for example, as the power receiving coil 21, a coil formed by winding a conductive wire rod, or a so-called pattern coil or a pattern loop that is formed by arranging a conductive pattern on a printed-wiring board or a flexible printed circuit board may be used. Moreover, for example, as the power receiving coil 21, a spiral-shape coil or a helical-shape coil configured by winding a wire in a thickness direction thereof may be used, or the power receiving coil 21 may be configured using an alpha-wound shape configured by folding a spiral coil into two layers, or a multilayer spiral shape. Incidentally, similarly to the case of the power feeding coil 14 of the power feeding unit 10, a shield formed of a magnetic material, a conductive material, or the like may be provided around the power receiving coil 21 in order to prevent leakage of magnetic flux. In addition, a magnet may be provided around the power receiving coil 21 in order to facilitate positioning between the power feeding unit 10 and the electronic apparatus 90.

The power receiving coil section 121 is connected to a first end of the impedance matching circuit 24 or the like, and the impedance matching circuit 24 is supplied with an AC power signal Sp2 having a voltage according to the induction voltage between both ends of the power feeding coil 14. In other words, the power signal Sp2 corresponds to the power signal Sp1 in the power feeding unit 10. Specifically, for example, a frequency of the power signal Sp2 is equal to the frequency fp of the power signal Sp1. The power receiving unit 20 generates DC power having a desired voltage based on the power signal Sp2, and supplies the DC power to the load 80.

For example, in the power receiving coil 121, the power receiving coil 21 and the capacitor 22 may be connected in series to each other to configure the LC resonance circuit. In the feed system 1, the capacitance value of the capacitor 22 and the inductance value of the power receiving coil 21 are designed so that the resonance frequency f2 of the LC resonance circuit is substantially equal to or close to the resonance frequency f1 of the LC resonance circuit in the power feeding unit 10. Moreover, for example, the capacitance value of the capacitor 22 may be configured to be variable with use of a variable capacitor. In this case, the resonance frequency f2 is allowed to be adjusted.

Note that the configuration of the power receiving coil section 121 is not limited to the configuration in which the power receiving coil 21 and the capacitor 22 are connected in series to each other in this way, and may be a configuration in which the power receiving coil 21 and the capacitor 22 are connected in parallel to each other, or may be a configuration in which other element is added and the series connection and parallel connection are combined. For example, a capacitor 23 is further provided, the power receiving coil 21 and the capacitor 22 are connected in series to each other, and the capacitor 23 may be connected in parallel to the power receiving coil 21 and the capacitor 22 that are connected in series to each other. Note that the capacitor 22 is provided in this example; however, this is not limitative. For example, the capacitor 22 may be omitted. Specifically, for example, the capacitor 22 may be omitted in the case where the desired resonance frequency f2 is obtainable by an inter-wire capacitance (a parasitic capacitance) of the power receiving coil 12, a capacitance between the power receiving coil 21 and the power feeding coil 14, or the like without providing the capacitor 22. Moreover, the capacitor 22 may also be omitted in the case where high power feeding efficiency is achievable without providing the capacitor 22.

Moreover, the LC resonance circuit is configured using the power receiving coil 21 and the capacitor 22 in this example. However, this is not limitative, and other elements may be further added, or other resonance circuit may be further provided.

The impedance matching circuit 24 matches the impedance of the power receiving unit 20 with the impedance of the power feeding unit 10. The first end of the impedance matching circuit 24 is connected to the power receiving coil section 121, and a second end thereof is connected to an input terminal of the rectification circuit 25. In the feed system 1, the impedance matching is performed in such a way so that the power feeding efficiency from the power feeding unit 10 to the power receiving unit 20 is allowed to be enhanced. As the impedance matching circuit 24, a circuit having a fixed circuit constant may be used, or a circuit that includes a variable element such as a variable capacitor and has a variable circuit constant may be used. Incidentally, although the impedance matching circuit 24 is provided in this example, this is not limitative. The impedance matching circuit 24 may be omitted in the case where high power feeding efficiency is achievable without providing the impedance matching circuit 24.

The rectification circuit 25 rectifies the AC signal supplied from the impedance matching circuit 24 to generate a DC signal having a voltage Vrect. Moreover, the rectification circuit 25 is capable of turning on or off the operation based on the instruction from the receiving control section 28.

The regulator 26 generates DC power having a stable desired voltage Vreg that is to be supplied to the load 80, based on the DC signal supplied from the rectification circuit 25. Moreover, the regulator 26 is capable of turning on or off the operation based on the instruction from the receiving control section 28.

The load connection section 27 connects the regulator 26 to the load 80 therethrough based on the instruction from the receiving control section 28. Specifically, when receiving instruction to connect the load 80 from the receiving control section 28, the load connection section 27 is put into a connection state. As a result, the power receiving unit 20 supplies the DC power to the load 80. On the other hand, when receiving instruction to disconnect the load 80 from the receiving control section 28, the load connection section 27 is put into a disconnection state. As a result, the power receiving unit 20 stops the supply of the DC power to the load 80.

The receiving control section 28 controls the operation of the power receiving unit 20 based on the power signal Sp2 and the output voltage Vrect of the rectification circuit 25. Specifically, as will be described later, the receiving control section 28 acquires the frequency fp of the power signal Sp2 based on the AC voltage of the power signal Sp2, and generates the feeding control signal CTL based on the frequency fp of the power signal Sp2 and the output voltage Vrect of the rectification circuit 25 and controls the operation of the rectification circuit 25, the regulator 26, and the load connection section 27. For example, the receiving control section 28 starts the operation of the rectification circuit 25 and the regulator 26 when the power feeding from the power feeding unit 10 to the power receiving unit 20 is started. Then, the receiving control section 28 performs increase request, decrease request, or the like of the feed power to the power feeding unit 10 through the feeding control signal CTL, based on the frequency fp of the power signal Sp2 and the voltage Vrect, and when a predetermined condition is satisfied, the receiving control section 28 instructs the load connection section 27 to connect the load 80. Then, when the secondary battery 82 is sufficiently charged, for example, the receiving control section 28 may stop the operation of the rectification circuit 25 and the regulator 26, or may instruct the load connection section 27 to disconnect the load 80.

When acquiring the frequency fp of the power signal Sp2, for example, the receiving control section 28 may separate a fundamental wave component from a harmonic component and a noise component of the power signal Sp2 to extract only the fundamental wave component, and then may acquire the frequency fp based on the fundamental wave component. Moreover, for example, the receiving control section 28 may perform separation of a real number component and an imaginary number component of the power signal Sp2, and may acquire the frequency fp based on these components. Moreover, when acquiring the frequency fp of the power signal Sp2 and the voltage Vrect, for example, the receiving control section 28 may acquire the frequency fp and the voltage Vrect a plurality of times, and may perform averaging processing, noise reduction, and the like. Furthermore, the receiving control section 28 may further acquire information such as duty ratio, phase, and amplitude of the power signal Sp2, in addition to the frequency fp of the power signal Sp2.

The modulation section 29 transmits the feeding control signal CTL that is supplied from the receiving control section 28, to the power feeding unit 10 through so-called load modulation when the power feeding unit 10 feeds the electronic apparatus 90 (the power receiving unit 20) with power. In this example, the modulation section 29 communicates with the power feeding unit 10 through the load modulation; however, the modulation method is not limited thereto. Alternatively, for example, the modulation section 29 may perform modulation by a modulation method other than the load modulation. Moreover, the modulation section 29 transmits the feeding control signal CTL to the power feeding unit 10; however, this is not limitative. For example, the modulation section 29 may transmit data not relating to the feeding operation.

In this example, the power receiving unit 20 has the modulation section 29 transmitting the feeding control signal CTL to the power feeding unit 10; however, this is not limitative. Alternatively, for example, the power receiving unit 20 may includes a communication coil, an antenna, and a communication section that transmits the feeding control signal CTL to the power feeding unit 10 through the communication coil and the antenna. In this case, for example, the communication section may transmit or receive data not relating to the feeding operation.

In the load 80, the charging control section 81 controls charging of the secondary battery 82 based on the DC power supplied from the power receiving unit 20. The charging control section 81 is capable of supplying power not only to the secondary battery 82 but also to the electronic circuit 83 in this example. The secondary battery 82 stores therein the DC power supplied from the power receiving unit 20, and may be configured using a rechargeable battery such as a lithium ion battery. The electronic circuit 83 receives supply of the power from the secondary battery 82 and the charging control section 81 to perform operation to achieve the function of the electronic apparatus 90.

Incidentally, in this example, the receiving control section 28 and the charging control section 81 are provided separately from each other; however, the configuration is not limited thereto. Alternatively, for example, the receiving control section 28 may be configured integrally with the charging control section 81 so as to have the function of the charging control section 81. Moreover, for example, the receiving control section 28 may be configured so as to have a part of the function of the charging control section 81, or the charging control section 81 may be configured so as to have a part of the function of the receiving control section 28.

Here, the impedance matching circuit 24, the rectification circuit 25, and the regulator 26 correspond to a specific example of "power generation section" in the present disclosure. The receiving control section 28 corresponds to a specific example of "control section" in the present disclosure. The voltage Vrect corresponds to a specific example of "first signal" in the present disclosure.

(Operation and Function)

Subsequently, operation and a function of the feed system 1 according to the present embodiment will be described.

(General Operation Outline)

First, with reference to FIGS. 1 to 4, general operation outline of the feed system 1 is described. In the power feeding unit 10, the power signal generation section generates the AC power signal Sp1 based on the instruction from the feeding control section 16. The impedance matching circuit 12 matches the impedance of the power feeding unit 10 with the impedance of the power receiving unit 20. The power feeding coil 14 of the power feeding coil section 114 generates an electromagnetic field based on the power signal Sp1 supplied through the impedance matching circuit 12. The demodulation section 15 demodulates the feeding control signal CTL that is transmitted by the power receiving unit 20 through the so-called load modulation. The feeding control section 16 controls the feeding operation of the power feeding unit 10 based on the feeding control signal CTL.

In the electronic apparatus 90, the power receiving coil 21 of the power receiving coil section 121 generates, based on the electromagnetic field generated by the power feeding coil 14, an induction voltage according to the change of the magnetic flux thereof. The power receiving coil section 121 outputs the power signal Sp2 corresponding to the power signal Sp1. The impedance matching circuit 24 matches the impedance of the power receiving unit 20 with the impedance of the power feeding unit 10. The rectification circuit 25 rectifies the AC signal supplied from the impedance matching circuit 24 to generate the DC signal having the voltage Vrect. The regulator 26 generates the DC power having the stable desired voltage Vreg that is to be supplied to the load 80, based on the DC signal supplied from the rectification circuit 25. The load connection section 27 connects the regulator 26 to the load 80 based on the instruction from the receiving control section 28. The receiving control section 28 acquires the frequency fp of the power signal Sp2 based on the AC voltage of the power signal Sp2, generates the feeding control signal CTL based on the frequency fp and the voltage Vrect, and performs increase request, decrease request, or the like of the feed power to the power feeding unit 10 as well as controls the operation of the load connection section 27 and the like. The modulation section 29 transmits the feeding control signal CTL that is supplied from the receiving control section 28, to the power feeding unit 10 through the so-called load modulation when the power feeding unit 10 feeds the power receiving unit 20 with power.

In the load 80, the charging control section 81 controls charging to the secondary battery 82 based on the DC power supplied from the power receiving unit 20. The secondary battery 82 stores therein the DC power supplied from the power receiving unit 20. The electronic circuit 83 receives the supply of the power from the secondary battery 82 and the like, and performs the operation to achieve the function of the electronic apparatus 90.

(Detailed Operation)

The power feeding unit 10 transmits power to the power receiving unit 20 of the electronic apparatus 90 with use of magnetic coupling between the power feeding coil 14 and the power receiving coil 21. At this time, the power receiving unit 20 instructs the power feeding unit 10 to increase, decrease, or the like the feed power, and when the predetermined condition is satisfied, the power receiving unit 20 starts supply of the DC power to the load 80. The operation of the power feeding unit 10 and the power receiving unit 20 will be described in detail below.

Figure 5:
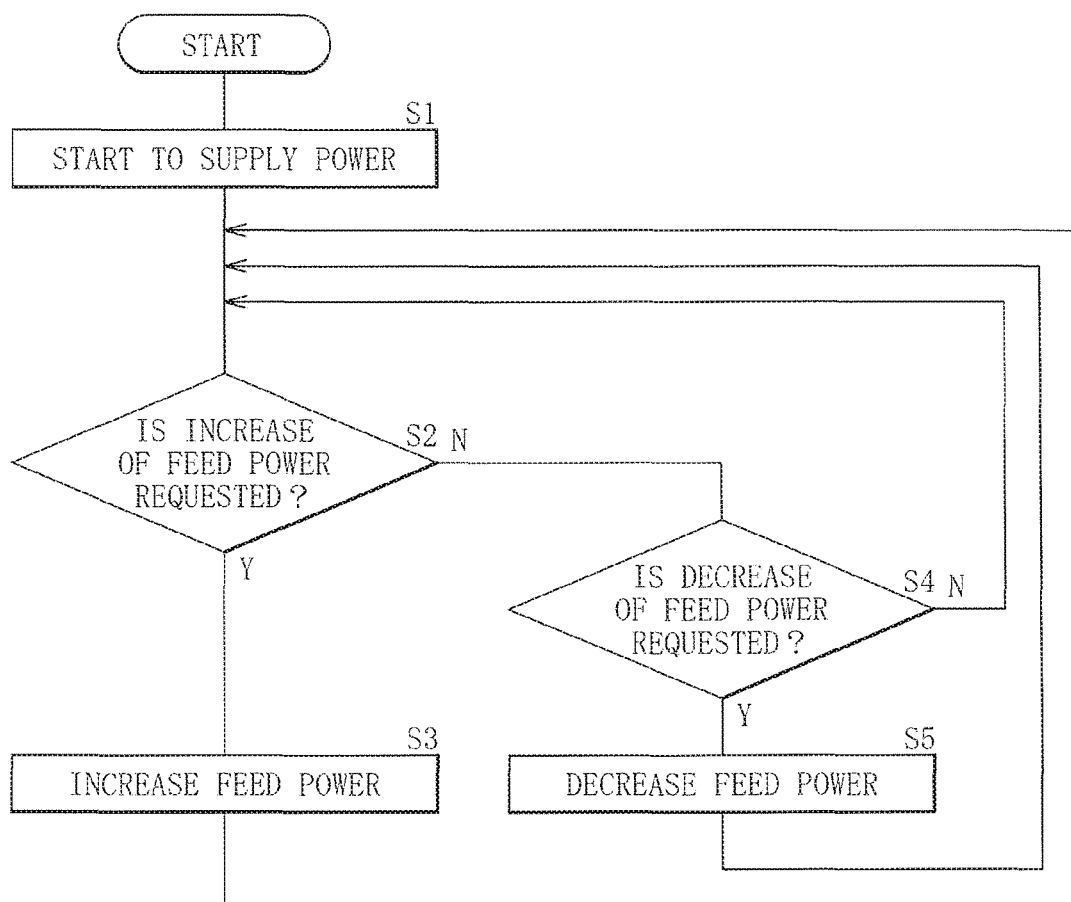
FIG. 5 is a flowchart illustrating an operation example of the power feeding unit illustrated in FIG. 2.

FIG. 5 is a flowchart of the operation of the power feeding unit 10 at the time of starting the power feeding. The power feeding unit 10 starts the power feeding to the power receiving unit 20, and adjusts the feed power in response to the instruction from the power receiving unit 20. The detail thereof will be described below.

First, when a user places the electronic apparatus 90 on the power feeding surface S1 of the power feeding unit 10, the power feeding unit 10 starts supply of power to the power receiving unit 20 (step S1). Specifically, the feeding control section 16 of the power feeding unit 10 detects that the electronic apparatus 90 is placed on the power feeding surface S1, and allows the power signal generation section 11 to generate the power signal Sp1. At this time, for example, the power signal generation section 11 may desirably generate the power signal Sp1 of the frequency fp that is capable of achieving small feed power. Alternatively, for example, the power signal generation section 11 may generate the power signal Sp1 of various frequencies fp in a time-divisional manner.

In the electronic apparatus 90, the receiving control section 28 of the power receiving unit 20 detects that the power is supplied from the power feeding unit 10, and generates the feeding control signal CTL that indicates increase request or decrease request of the feed power as necessary. The modulation section 29 then transmits the feeding control signal CTL to the power feeding unit 10.

In the power feeding unit 10, the demodulation section 15 demodulates the feeding control signal CTL. Then, the feeding control section 16 determines whether the feeding control signal CTL indicates the increase request of the feed power (step S2).

At the step S2, when the feeding control signal CTL indicates the increase request of the feed power, the power feeding unit 10 increases the feed power (step S3). Specifically, the feeding control section 16 controls the power signal generation section 11 to decrease the frequency fp of the power signal Sp1. As a result, as illustrated in FIG. 3, the feed power is increased in the feed system 1. After that, the process returns to the step S2.

At the step S2, when the feeding control signal CTL does not indicate the increase request of the feed power, the feeding control section 16 determines whether the feeding control signal CTL indicates the decrease request of the feed power (step S4).

At the step S4, when the feeding control signal CTL indicates the decrease request of the feed power, the power feeding unit 10 decreases the feed power (step S5). Specifically, the feeding control section 16 controls the power signal generation section 11 to increase the frequency fp of the power signal Sp1. As a result, as illustrated in FIG. 3, the feed power is decreased in the feed system 1. After that, the process returns to the step S2.

The flow is thus ended. The power feeding unit 10 starts the power feeding to the power receiving unit 20 through such a flow. Next, the operation of the power receiving unit 20 at the time when the power feeding unit 10 starts the power feeding in such a way will be described.

Figure 6:
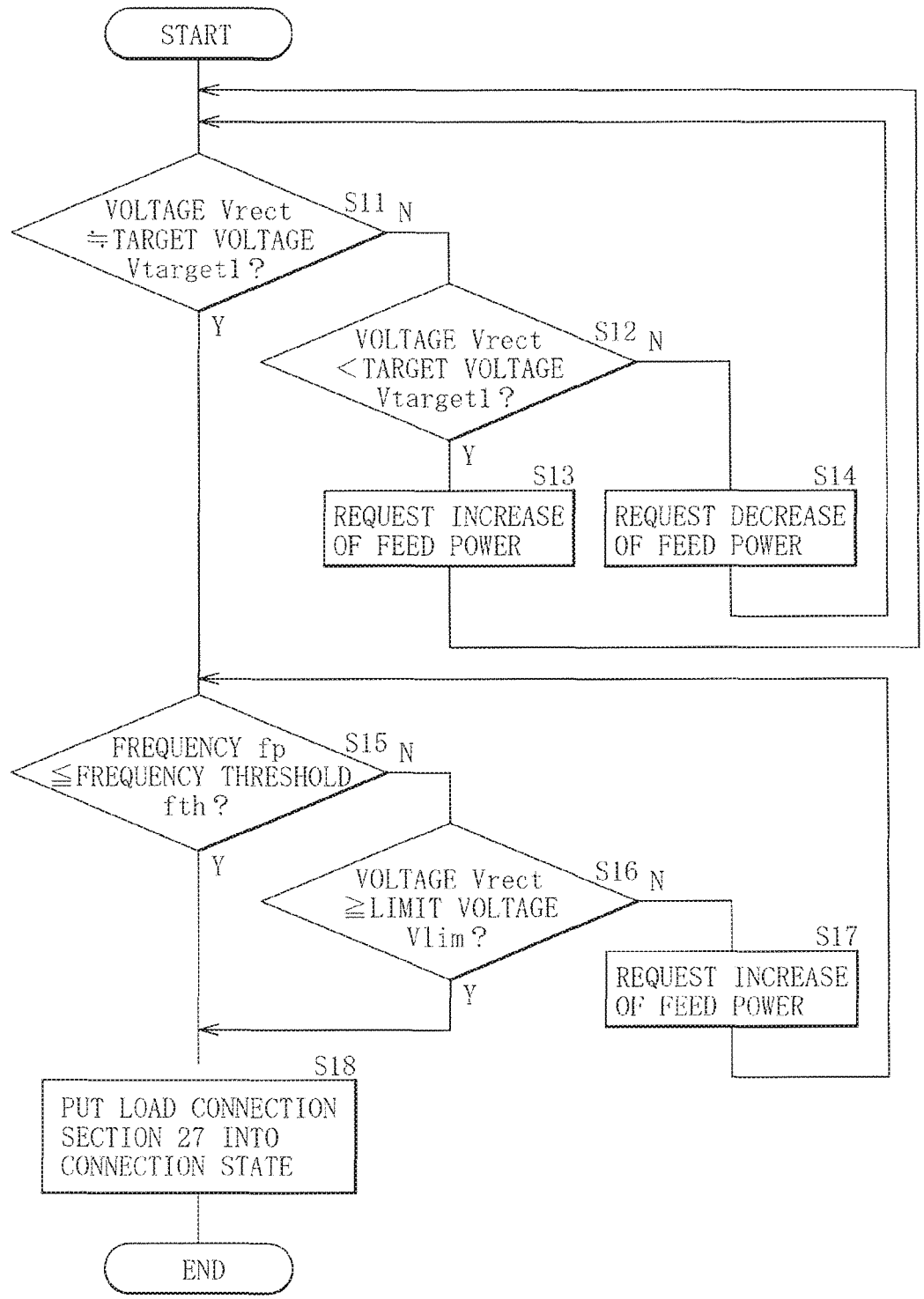
FIG. 6 is a flowchart illustrating an operation example of the power receiving unit illustrated in FIG. 4.
Figure 7:
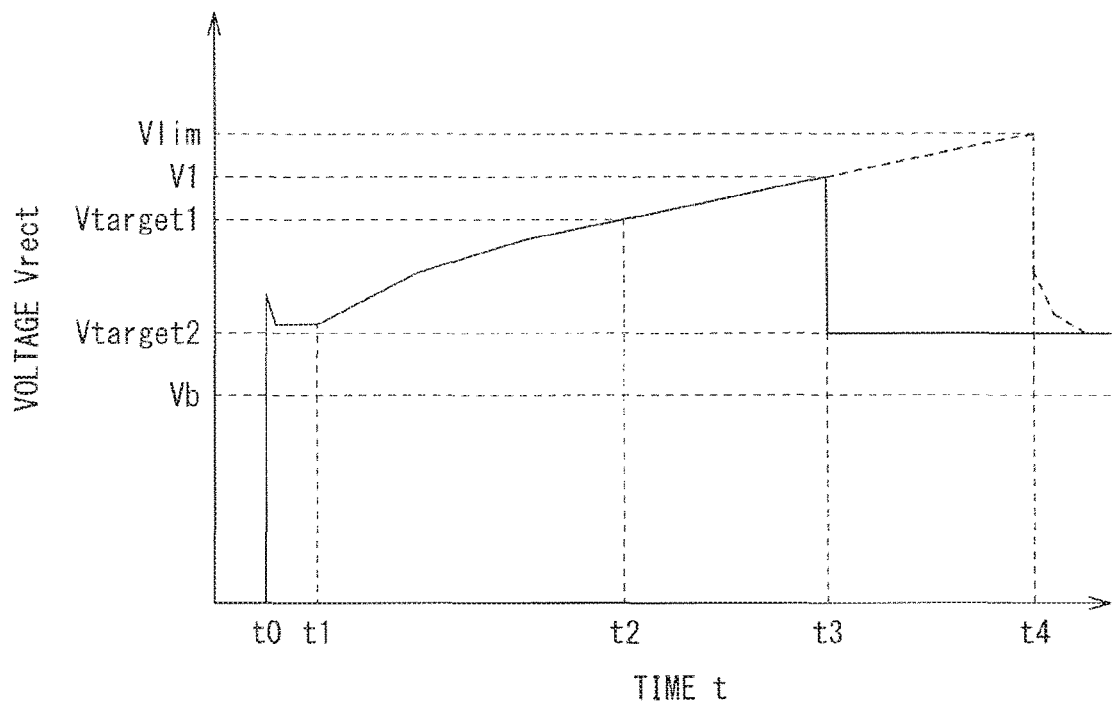
FIG. 7 is a timing waveform chart illustrating an operation example of the power receiving unit illustrated in FIG. 6.

FIG. 6 is a flowchart of the operation of the power receiving unit 20 at the time of starting the power feeding. FIG. 7 is a timing waveform chart of the output voltage Vrect of the rectification circuit 25. As illustrated in FIG. 7, when the user places the electronic apparatus 90 on the power feeding surface S1 of the power feeding unit 10 and the power feeding unit 10 starts the power feeding to the power receiving unit 20 at a timing t0, the receiving control section 28 of the power receiving unit 20 starts the operation of the rectification circuit 25 and the regulator 26, which increases the output voltage Vrect of the rectification circuit 25. At this time, the load connection section 27 is still in a disconnection state. After that, the power receiving unit 20 instructs the power feeding unit 10 to increase or decrease the feed power through the feeding control signal CTL at and after a timing t1, and as described below, when the predetermined condition is satisfied, the power receiving unit 20 starts the supply of the DC power to the load 80.

First, the receiving control section 28 determines whether the output voltage Vrect of the rectification circuit 25 is close to a preset target voltage Vtarget1 (Vrect≈Ntarget1) (step S11). Specifically, the receiving control section 28 determines whether the voltage Vrect is within a predetermined voltage range including the target voltage Vtarget1. The voltage range is defined by detection accuracy of the voltage Vrect, a sampling frequency, etc.

When the voltage Vrect is farther from the target voltage Vtarget1, the receiving control section 28 determines whether the voltage Vrect is lower than the target voltage Vtartet1 (Vrect<Vtarget1) (step S12).

When the voltage Vrect is lower than the target voltage Vtarget1 at the step S12, the power receiving unit 20 requests the power feeding unit 10 to increase the feed power (step S13). Specifically, the receiving controls section 28 generates the feeding control signal CTL indicating increase request of the feed power, and the modulation section 29 transmits the feeding control signal CTL to the power feeding unit 10 through the load modulation. In response thereto, the power feeding unit 10 increases the feed power. After that, the process returns to the step S11.

Moreover, when the voltage Vrect is higher than the target voltage Vtarget1 at the step S12, the power receiving unit 20 requests the power feeding unit 10 to decrease the feed power (step S14). Specifically, the receiving control section 28 generates the feeding control signal CTL indicating decrease request of the feed power, and the modulation section 29 transmits the feeding control signal CTL to the power feeding unit 10 through the load modulation. In response thereto, the power feeding unit 10 decreases the feed power. After that, the process returns to the step S11.

In the power receiving unit 20, the voltage Vrect becomes close to the target voltage Vtarget1 by repeating these steps S11 to S14.

In the example of FIG. 7, the voltage Vrect is lower than the target voltage Vtarget1 during a period of the timings t1 to t2 (steps S11 and S12), the power receiving unit 20 requests the power feeding unit 10 to increase the feed power (step S13), and in response thereto, the output voltage Vrect of the rectification circuit 25 is increased. Then, the voltage Vrect is gradually increased toward the target voltage Vtarget1 by repeating the steps S11 to S13. Then, the voltage Vrect becomes substantially equal to the target voltage Vtarget1 at the timing t2.

When the voltage Vrect is close to the target voltage Vtarget1 at the step S11, the receiving control section 28 determines whether the frequency fp of the power signal Sp2 is equal to or lower than a preset predetermined frequency threshold fth (fp≤fth) (step S15). When the frequency fp is equal to or lower than the frequency threshold fth, the process proceeds to a step S18.

When the frequency fp is larger than the frequency threshold fth at the step S15, the receiving control section 28 then determines whether the voltage Vrect is equal to or larger than a preset limit voltage Vlim (Vrect≥Vlim) (step S16). When the voltage Vrect is equal to or larger than the limit voltage Vlim, the process proceeds to step S18. When the voltage Vrect is lower than the limit voltage Vlim, the power receiving unit 20 requests the power feeding unit 10 to increase the feed power (step S17). In response thereto, the power feeding unit 10 increases the feed power. After that, the process returns to the step S15.

Figure 8:
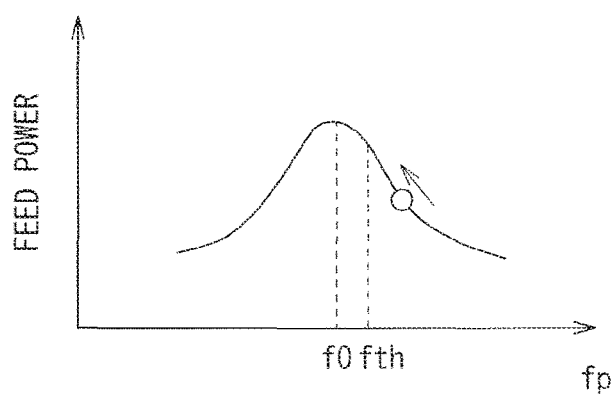
FIG. 8 is an explanatory diagram illustrating an operation example of the power receiving unit illustrated in FIG. 6.

FIG. 8 illustrates the operation of the power receiving unit 20 at the steps S15 to S17. When the frequency fp is larger than the frequency threshold fth (step S15) and the voltage Vrect is lower than the limit voltage Vilm (step S16), the power receiving unit 20 requests the power feeding unit 10 to increase the feed power (step S17). In response to the request, the feeding control section 16 of the power feeding unit 10 controls the power signal generation section 11 to lower the frequency fp of the power signal Sp1. As illustrated in FIG. 8, the frequency fp is gradually lowered toward the frequency threshold fth by repeating the steps S15 to S17. In addition, since the feed power is increased, the voltage Vrect is gradually increased toward the limit voltage Vlim. In this way, the receiving control section 28 continues the increase request of the feed power (step S17) until the frequency fp becomes equal to or lower than the frequency threshold fth (step S15) or the voltage Vrect becomes equal to or larger than the limit voltage Vlim (step S16).

Next, the receiving control section 28 instructs the load connection section 27 to connect the load 80, and thus the load connection section 27 is put into a connection state (step S18). Accordingly, the power receiving unit 20 starts to supply the DC power to the load 80.

In the example of FIG. 7, in the power receiving unit 20, although not illustrated, the frequency fp is larger than the frequency threshold fth (step S15) and the voltage Vrect is lower than the limit voltage Vlim (step S16) during a period of the timings t2 to t3. Therefore, the power receiving unit 20 requests the power feeding unit 10 to increase the feed power (step S17), and in response thereto, the output voltage Vrect of the rectification circuit 25 is increased. Then, the voltage Vrect is gradually increased by repeating the steps S15 to S17. After that, when the voltage Vrect becomes a certain V1 at the timing t3, the frequency fp becomes equal to or lower than the frequency threshold fth (step S15), and the power receiving unit 20 starts to supply the DC power to the load 80.

At this time, the output voltage Vrect of the rectification circuit 25 is decreased from the voltage V1 immediately after the load 80 is connected. The voltage drop amount Vdrop is represented as follows.

$$V\text{drop} \approx Z_2 \cdot I\text{load} \quad (1)$$

$$Z_2 = R_2 + j\omega(L_2 - M) + 1/j\omega C_2 \quad (2)$$

$$\omega = 2\pi fp \quad (3)$$

Where, $Z_2$ is impedance of the LC resonance circuit of the power receiving unit 20, and Iload is a load current value as viewed from the rectification circuit 25. Moreover, $R_2$ is a serial resistance value of the LC resonance circuit of the power receiving unit 20, $L_2$ is self-inductance of the LC resonance circuit of the power receiving unit 20, M is mutual inductance between the LC resonance circuit of the power receiving unit 20 and the LC resonance circuit of the power feeding unit 10, and $C_2$ is an electrostatic capacitance of the LC resonance circuit of the power receiving unit 20.

In the power receiving unit 20, even if the voltage Vrect is decreased immediately after the load 80 is connected in this way, the voltage Vrect is allowed to be higher than a block voltage Vb that is a voltage necessary for the operation of the power receiving unit 20. Therefore, the power receiving unit 20 is allowed to perform the operation continuously. As a result, in the power receiving unit 20, it is possible to reduce possibility of malfunction as compared with a case of a comparative example described later.

In the above-described example, the case where the frequency fp becomes equal to or lower than the frequency threshold fth at the timing t3 of FIG. 7 is assumed. However, when the frequency fp is constantly higher than the frequency threshold fth, the voltage Vrect becomes equal to or higher than the limit voltage Vlim at the timing t4 (step S16), and the power receiving unit 20 starts supply of the DC power to the load 80.

After that, the receiving control section 28 instructs the power feeding unit 10 to increase or decrease the feed power through the feeding control signal CTL to allow the voltage Vrect to keep a target voltage Vtarget2.

The flow is thus ended. The power receiving unit 20 starts to supply the DC power to the load 80 through such a flow. Next, the operation of the power receiving unit 20 until charging to the secondary battery 82 is completed will be described.

Figure 9:
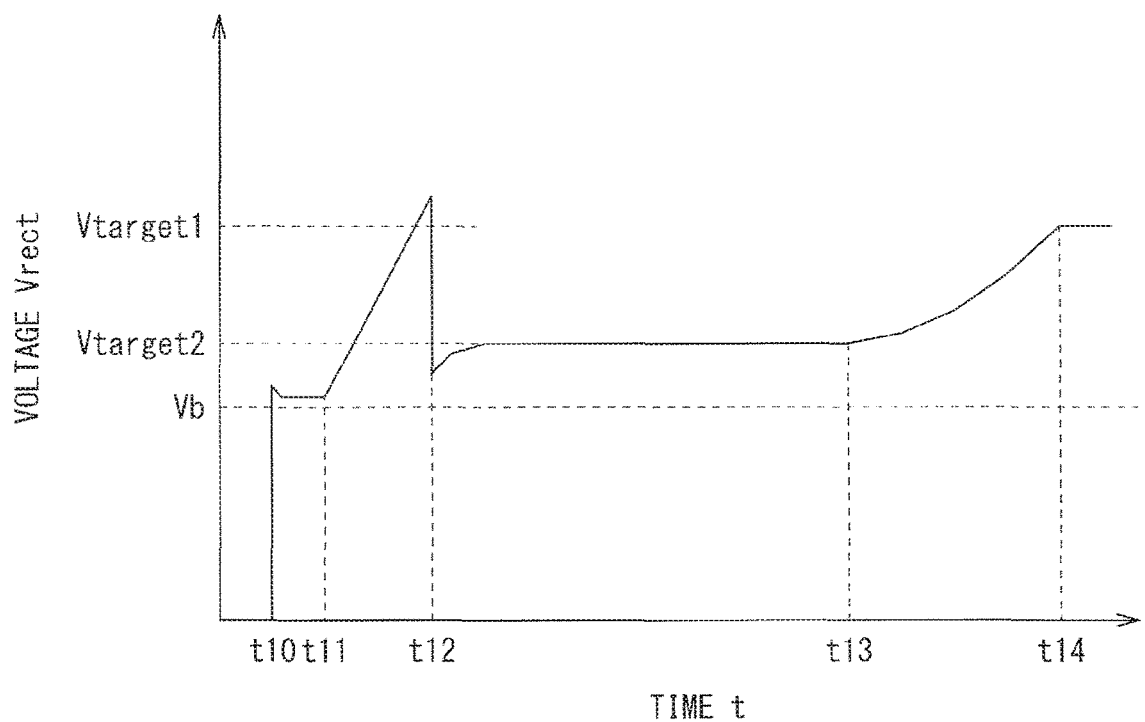
FIG. 9 is another timing waveform chart illustrating an operation example of the power receiving unit illustrated in FIG. 4.

FIG. 9 is a timing waveform chart of the voltage Vrect. Similarly to FIG. 7, when a user places the electronic apparatus 90 on the power feeding surface S1 of the power feeding unit 10 at a timing t10, the voltage Vrect is increased. Then, at a timing t11, the power receiving unit 20 communicates with the power feeding unit 10, and thus the voltage Vrect is increased toward the target voltage Vtarget1. Then, after the voltage Vrect reaches the target voltage Vtarget1, the power receiving unit 20 starts to supply the DC power to the load 80 at a timing t12. Accordingly, the charging control section 81 of the load 80 starts to charge the secondary battery 82.

The receiving control section 28 instructs the power feeding unit 10 to increase or decrease the feed power through the feeding control signal CTL to allow the voltage Vrect to keep the target voltage Vtarget2 during a period of the timings t12 to t13. In other words, the power receiving unit 20 performs so-called constant current (CC) charging during the period of the timings t12 to t13.

Next, the receiving control section 28 instructs the power feeding unit 10 to increase or decrease the feed power through the feeding control signal CTL to allow the voltage Vrect to be gradually increased during a period of timings t13 to t14. At this time, the receiving control section 28 gradually increases the voltage Vrect by gradually increasing the target voltage Vtarget2. In other words, the power receiving unit 20 performs so-called constant voltage (CV) charging during the period of the timings t13 to t14.

In this way, in the power receiving unit 20, when the charged amount of the secondary battery 82 is small (during the period of the timings t12 to t13), the load current Iload is large heavy load. Therefore, the receiving control section 28 sets the target voltage Vtarget2 low. Moreover, when the charged amount of the secondary battery 82 is large (during the period of the timings t13 to t14), the load current is small light load. Therefore, the receiving control section 28 sets the target voltage Vtarget2 to be gradually increased based on the load current Iload.

Then, at the timing t14, charging of the secondary battery 82 is completed.

Comparative Example

Next, a function of the present embodiment is described as compared with a comparative example. The comparative example is different from the present embodiment in the operation of the receiving control section 28. Specifically, in the present embodiment (FIG. 4, FIG. 6, etc.), the power receiving unit 20 that acquires the frequency fp of the power signal Sp2 and the output voltage Vrect of the rectification circuit 25 is configured. Alternatively, in the present comparative example, a power receiving unit 20R is configured using a receiving control section 28R that does not acquire the frequency fp of the power signal Sp2 and acquires the output voltage Vrect of the rectification circuit 25. The other configurations are similar to those in the present embodiment (FIG. 1).

Figure 10:
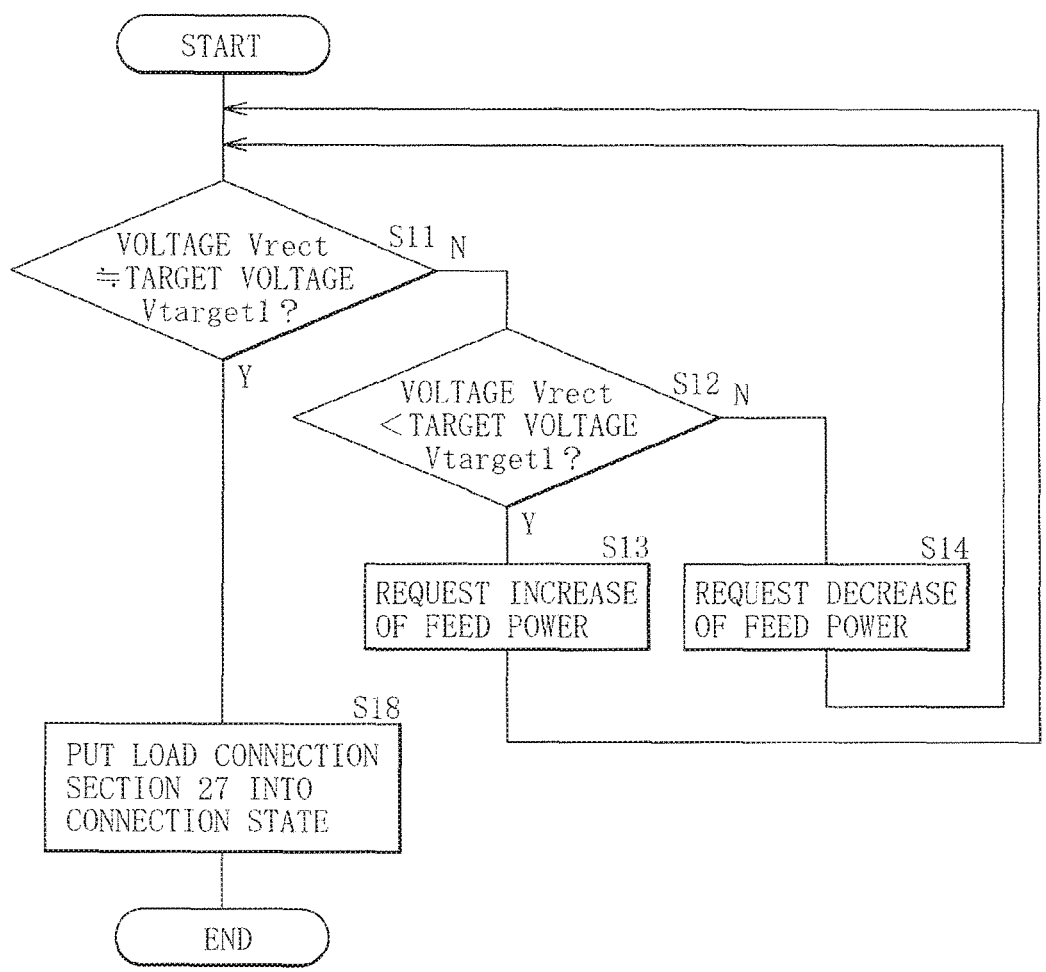
FIG. 10 is a flowchart illustrating an operation example of a power receiving unit according to a comparative example.

FIG. 10 is a flowchart of operation of the power receiving unit 20R at the time of starting the power feeding. Similarly to the power receiving unit 20 according to the present embodiment, in the power receiving unit 20R, the output voltage Vrect of the rectification circuit 25 is made close to the target voltage Vtarget1 through the steps S11 to S14. Then, when the voltage Vrect is close to the target voltage Vtarget1 at the step S11, the receiving control section 28R puts the load connection section 27 into the connection state (step S18). Specifically, when the voltage Vrect is close to the target voltage Vtarget1 (Vrect≈Ntarget1) at the step S11, the power receiving unit 20 according to the present embodiment subsequently performs the operation based on the frequency fp of the power signal Sp2 and the like at the steps S15 to S17, whereas in the power receiving unit 20R according to the present comparative example, the load connection section 27 is put into the connection state without performing the steps S15 to S17.

Figure 11:
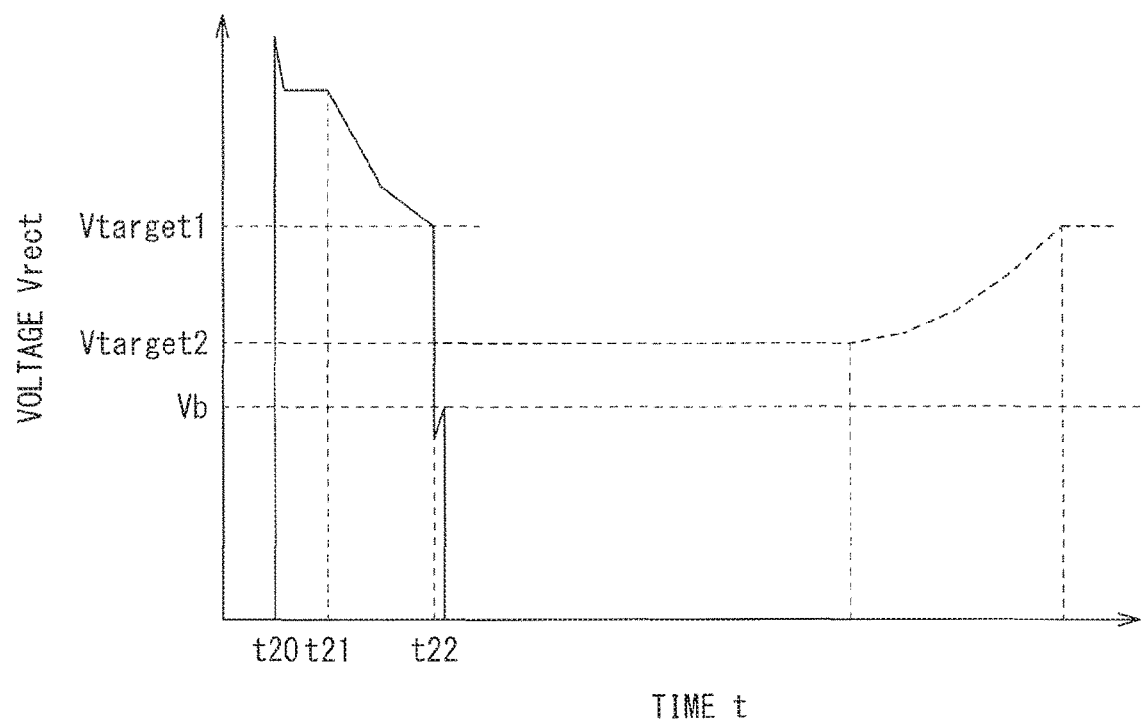
FIG. 11 is a timing waveform chart illustrating an operation example of the power receiving unit illustrated in FIG. 10.

FIG. 11 is a timing waveform chart of the voltage Vrect in the power receiving unit 20R according to the comparative example. Similarly to the case of the present embodiment (FIG. 9), when the user places an electronic apparatus including the power receiving unit 20R on the power feeding surface S1 of the power feeding unit 10 at a timing t20, the voltage Vrect is increased. Incidentally, in this example, the voltage Vrect is higher than the target voltage Vtarget1. Then, at a timing t21, the power receiving unit 20R communicates with the power feeding unit 10, and thus the voltage Vrect decreases toward the target voltage Vtarget1. Then, at a timing t22, the voltage Vrect reaches the target voltage Vtarget1, and the power receiving unit 20R connects the load 80.

At this time, the voltage Vrect is decreased to a voltage lower than the block voltage Vb that is a voltage necessary for the operation of the power receiving unit 20R, in response to the connection of the load 80. Accordingly, the power receiving unit 20 is not allowed to perform the operation continuously, and the receiving control section 28R is not allowed to instruct the power feeding unit 10 to increase or decrease the feed power in order to allow the voltage Vrect to keep the target voltage Vtarget2.

On the other hand, as illustrated in FIG. 6 and FIG. 7, in the power receiving unit 20 according to the present embodiment, the output voltage Vrect of the rectification circuit 25 is made close to the target voltage Vtarget1 through the steps S11 to S14, and then is further increased to the higher voltage V1 through the steps S15 to S17. Therefore, even if the voltage Vrect is decreased in response to subsequent connection of the load 80, it is possible to reduce possibility that the voltage Vrect is decreased to a voltage lower than the block voltage Vb. This makes it possible to reduce possibility of malfunction and to achieve a feed system capable of operating stably.

As illustrated in FIG. 6 and FIG. 7, the voltage V1 immediately before the connection of the load 80 is equal to or larger than the target voltage Vtarget1 and equal to or smaller than the limit voltage Vlim. The voltage V1 is varied depending on specification of the power feeding unit feeding the power receiving unit 20 with power. Specifically, for example, even in a power feeding unit having the configuration similar to that of the power feeding unit 10, a feed power range, minimum variation (resolution) at the time of adjusting the feed power, the configuration of each block such as the power signal generation section 11, the impedance matching circuit 12, and the power feeding coil section 114 may be different from those of the power feeding unit 10. Moreover, although the power feeding unit 10 is allowed to change supply power by changing the frequency fp of the power signal Sp1, for example, typically, there is a power feeding unit that changes the supply power by changing the voltage amplitude, the duty ratio, and the like of the power signal Sp1. In this way, since it is predicted that various power feeding units different in at least a part of respective specifications may be used, the voltage V1 may be a voltage value varied depending on the specification. Moreover, the voltage V1 may be varied depending on relative positional relationship between such a power feeding unit and the power receiving unit 20 during the power feeding operation. In other words, the power receiving unit 20 is configured to allow the voltage V1 immediately before the connection of the load 80 to be varied depending on the specification of the power feeding unit and the positional relationship at the time of the power feeding.

At this time, the possible range of the voltage V1 immediately before the connection of the load 80 may be desirably wide in such a degree that the voltage V1 is intentionally set. Specifically, as illustrated in FIG. 7, in the feed system 1, the power receiving unit 20 performs the increase request or the decrease request of the feed power to the power feeding unit 10 during the period of the timings t1 to t2, and the power feeding unit 10 changes the feed power in response to the request, to change the voltage Vrect. At this time, the voltage Vrect gradually changes over a plurality of times in response to change of the feed power over the plurality of times by the power feeding unit 10. Therefore, in the feed system 1, the possible range of the voltage V1 immediately before the connection of the load 80 may be desirably larger than a minimum variation of the voltage Vrect. This makes it possible to intentionally set the voltage V1 beyond the minimum variation (resolution) of the voltage Vrect.

Moreover, the possible range of the voltage V1 immediately before the connection of the load 80 may be desirably larger than a minimum value of voltage difference (Vrect−Vreg) between the output voltage Vrect of the rectification circuit 25 and the output voltage Vreg of the regulator 26 after the connection of the load 80. More specifically, the possible range of the voltage V1 immediately before the connection of the load 80 may be desirably larger than voltage difference between a minimum value in a set range of the target voltage Varget2 and the output voltage Vreg of the regulator 26 after the connection of the load 80. Note that the voltage difference is designed in consideration of various factors such a manufacturing variations and temperature change. Therefore, it is necessary to define the possible range of the voltage V1 immediately before the connection of the load 80 by taking into consideration the various factors. Specifically, the output voltage Vreg of the regulator 26 may be set to, for example, 5 V, and the minimum value of the target voltage Vtarget2 may be set to, for example, 5.2 V in consideration of the various factors. Therefore, the possible range of the voltage V1 immediately before the connection of the load 80 may be set to, for example, 0.25 V (>0.2 V=5.2 V−5.0 V) or more. In other words, the possible range of the voltage V1 immediately before the connection of the load 80 may be 5% or more of the output voltage Vreg (for example, 5 V) of the regulator 26.

In addition, in the power receiving unit 20, in the case where the frequency fp is equal to or smaller than the frequency threshold fth (fp≤fth) at the step S15 after the output voltage Vrect of the rectification circuit 25 is made close to the target voltage Vtarget1 through the steps S11 to S14, the load 80 is connected. In other words, the power receiving unit 20 controls the frequency fp to be decreased when the frequency fp is larger than the frequency threshold fth. Accordingly, as represented by the expressions (1) to (3), the impedance $Z_2$ is allowed to be decreased, and the voltage drop amount Vdrop is allowed to be decreased. As a result, it is possible to reduce possibility that the voltage Vrect is decreased to a voltage lower than the block voltage Vb immediately after the connection of the load 80, and to achieve the feed system capable of operating stably while reducing possibility of malfunction.

Moreover, the possibility of the malfunction is allowed to be reduced in such a way in the power receiving unit 20, which makes it possible to configure the feed system handling large load current. In other words, as represented by the expression (1) to (3), since the voltage drop amount Vdrop is increased as the load current Iload is increased, the voltage Vrect immediately after the connection of the load 80 becomes smaller as the load current Iload is larger. In the power receiving unit 20, as described above, since the voltage Vrect is made high as well as the frequency fp is made low immediately before the connection of the load 80, even when the load current Iload is large, it is possible to reduce possibility that the voltage Vrect is decreased to a voltage lower than the block voltage Vb immediately after the connection of the load 80.

Moreover, the possibility of the malfunction is allowed to be reduced in such a way in the power receiving unit 20, which makes it possible to enhance design flexibility of the power receiving coil 21. Specifically, as represented by the expressions (1) to (3), the voltage drop amount Vdrop is affected by the series resistance value $R_2$, the self-inductance $L_2$, and the like of the LC resonance circuit of the power receiving unit 20. In the power receiving unit 20, as described above, since the voltage Vrect is made high as well as the frequency fp is made low immediately before the connection of the load 80, for example, even in the case where the series resistance value $R_2$ or the self-inductance $L_2$ is slightly large, it is possible to reduce possibility that the voltage Vrect is decreased to a voltage lower than the block voltage Vb immediately after the connection of the load 80. In other words, since restriction to the power receiving coil 21 is alleviated, it is possible to enhance the design flexibility of the power receiving coil 21. The design flexibility is enhanced in such a manner, which makes it possible to more freely perform designing by taking into consideration of the dimension of the coil, heat generation around the coil, its cost, and the like.

Moreover, the possibility of the malfunction is allowed to be reduced in such a way in the power receiving unit 20, which makes it possible to receive supply of the power from any of power feeding units with various specifications, and to enhance compatibility of the power feeding units. Specifically, in the power receiving unit 20, as described above, since the voltage Vrect is made high as well as the frequency fp is made low immediately before the connection of the load 80, it is possible to reduce possibility that the voltage Vrect is decreased to a voltage lower than the block voltage Vb immediately after the connection of the load 80 even if any of power feeding units with various specifications is used.

Moreover, the possibility of the malfunction is allowed to be reduced in such a way in the power receiving unit 20, which makes it possible to widen tolerable range of the relative positional relationship between the power feeding unit 10 and the power receiving unit 20 (the electronic apparatus 90) during the power feeding. Specifically, as represented by the expressions (1) to (3), the voltage drop amount Vdrop is affected by the mutual inductance M. In the power receiving unit 20, as described above, the voltage Vrect is made high and the frequency fp is made low immediately before the connection of the load 80. This makes it possible to reduce possibility that the voltage Vrect is decreased to a voltage lower than the block voltage Vb immediately after the connection of the load 80 irrespective of the mutual inductance M. In other words, since restriction to the mutual inductance M is alleviated, the tolerable range of the mutual positional relationship between the power feeding unit 10 and the power receiving unit 20 (the electronic apparatus 90) is allowed to be widened.

(Effects)

As described above, in the present embodiment, since the voltage Vrect is made high as well as the frequency fp is made low immediately before the connection of the load 80, it is possible to reduce the possibility of malfunction and to achieve a feed system capable of operating stably. Moreover, this makes it possible to configure a feed system handling a large load current and to enhance the design flexibility of the power receiving coil. Further, power is allowed to be supplied from any of power feeding units with various specifications, which makes it possible to enhance compatibility of the power feeding units. Moreover, the tolerable range of the relative positional relationship between the power feeding unit and the power receiving unit (the electronic apparatus) during the power feeding is allowed to be widened.

(Modification 1-1)

Figure 12:
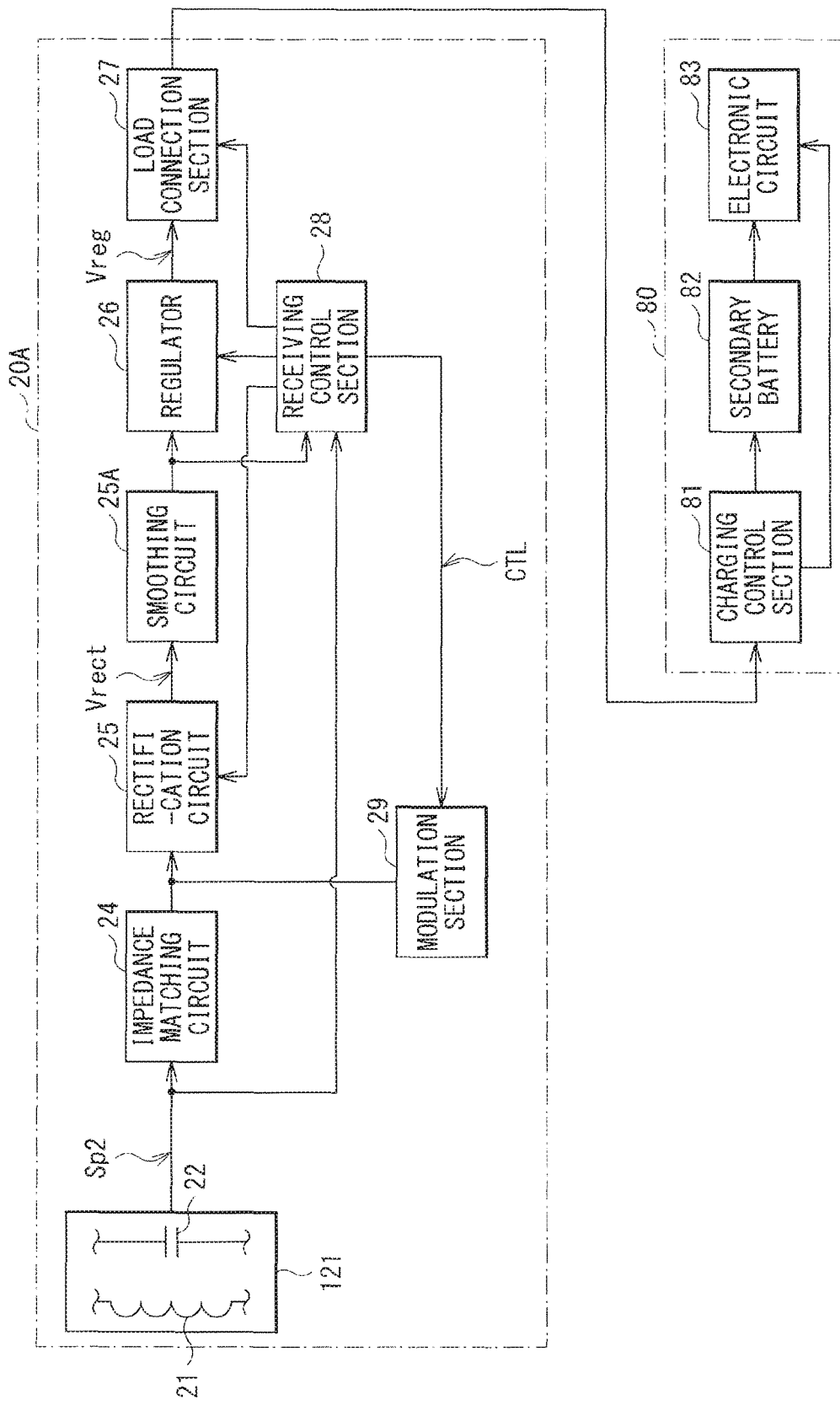
FIG. 12 is a block diagram illustrating a configuration example of a power receiving unit according to a modification of the first embodiment.

In the above-described embodiment, the output signal of the rectification circuit 25 is directly supplied to the regulator 26; however, this is not limitative. Alternatively, for example, as with a power receiving unit 20A illustrated in FIG. 12, a smoothing circuit 25A smoothing an input signal may be provided to smooth the output signal of the rectification circuit 25, and the smoothed signal may be supplied to the regulator 26. In this case, the receiving control section 28 may acquire the output voltage Vrect of the rectification circuit 25 similarly to the case of the above-described embodiment, or may be acquire, for example, an output voltage of the smoothing circuit 25A instead of the voltage Vrect, as illustrated in FIG. 12.

(Modification 1-2)

In the above-described embodiment, the receiving control section 28 acquires the output voltage Vrect of the rectification circuit 25; however, this is not limitative. Alternatively, for example, voltages of various circuits disposed in the rear stage of the rectification circuit 25, such as the output voltage of the regulator 26 may be acquired. Also in this case, it is possible to obtain effects similar to those in the case of the above-described embodiment by controlling the operation based on the output voltage. Moreover, for example, the receiving control section 28 may acquire voltage amplitude and current amplitude of AC signals in various circuits disposed in front stage of the rectification circuit 25, instead of the output voltage Vrect of the rectification circuit 25. Specifically, the receiving control section 28 may acquire voltage amplitude and current amplitude of the power signal Sp2, and voltage amplitude and current amplitude of the output signal of the impedance matching circuit 24. Also in this case, it is possible to obtain effects similar to those in the case of the above-described embodiment by controlling the operation based on the voltage amplitude and the current amplitude.

(Modification 1-3)

Figure 13:
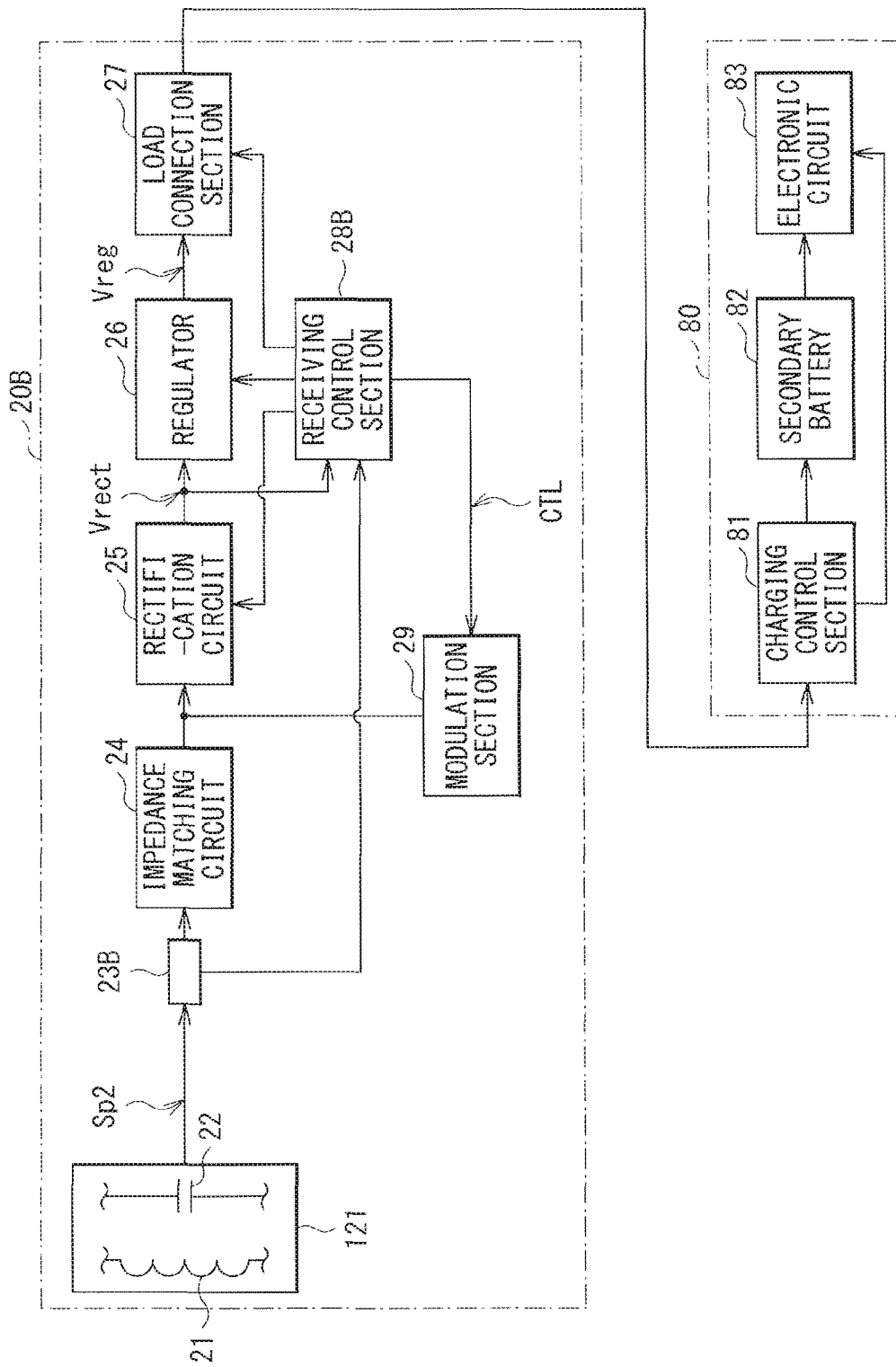
FIG. 13 is a block diagram illustrating a configuration example of a power receiving unit according to another modification of the first embodiment.

In the above-described embodiment, the receiving control section 28 acquires the frequency fp of the power signal Sp2 based on the AC voltage of the power signal Sp2; however, this is not limitative. For example, as with a power receiving unit 20B illustrated in FIG. 13, a current detection section 23B that detects an input current (an AC current) of the impedance matching circuit 24 may be provided, and a receiving control section 28B may acquire the frequency fp of the power signal Sp2 based on the detected AC current. As the current detection section 23B, for example, a shunt resistor may be used. In this case, a voltage between both ends of the shunt resistor is measured to obtain a current flowing through the shunt resistor. Moreover, for example, a current transformer may be used.

Figure 14:
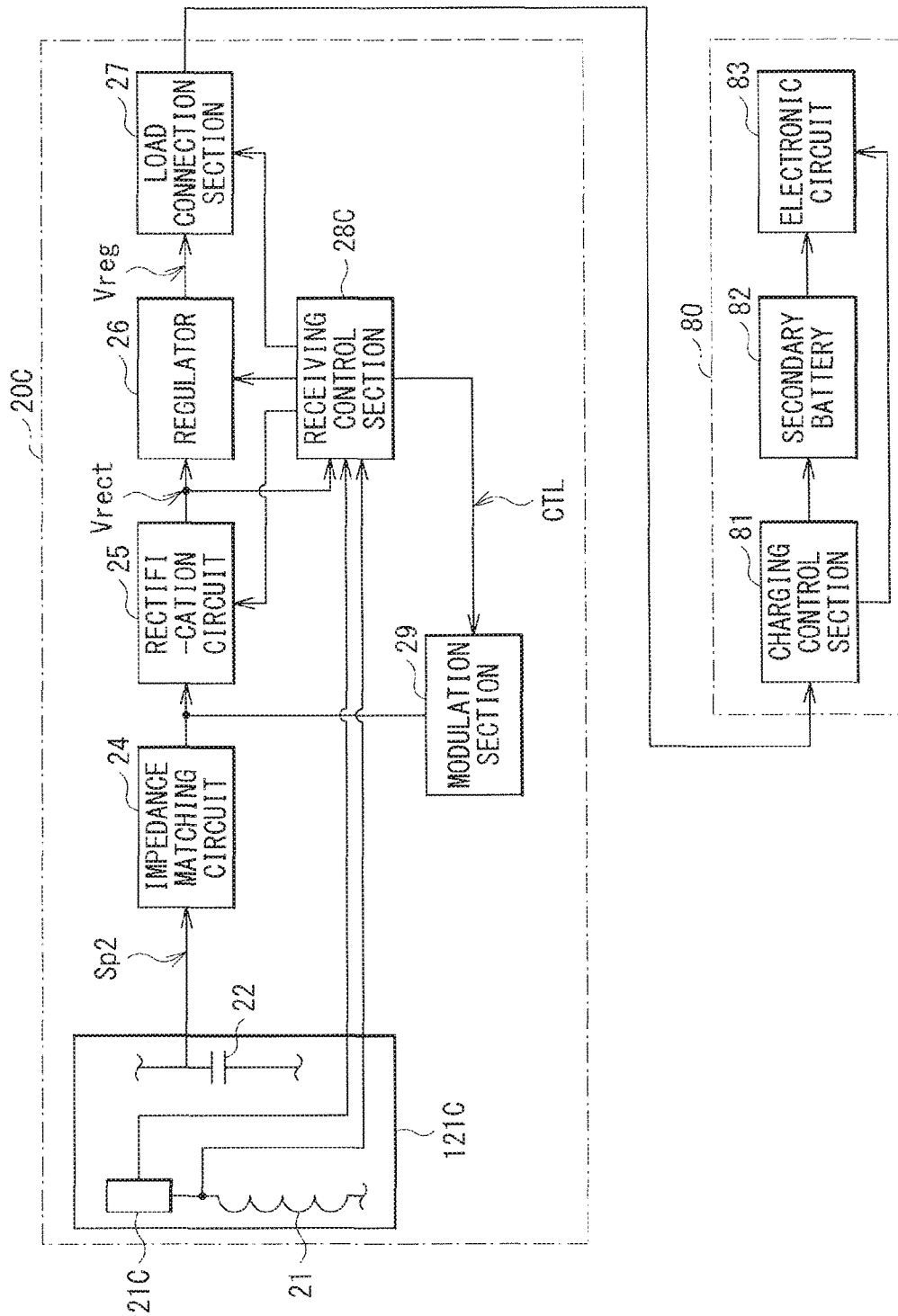
FIG. 14 is a block diagram illustrating a configuration example of a power receiving unit according to still another modification of the first embodiment.

A method of acquiring the frequency fp of the power signal Sp2 is not limited thereto, and the frequency fp may be acquired based on the AC signal in various circuits disposed in front stage of the rectification circuit 25. For example, as with a power receiving unit 20C illustrated in FIG. 14, the frequency fp of the power signal Sp2 may be acquired based on the AC voltage appearing in the power receiving coil 21, or a current detection section 21C that detects an AC current flowing through the power receiving coil 21 may be provided and the frequency fp of the power signal Sp2 may be acquired based on the detected AC current. Moreover, the frequency fp of the power signal Sp2 may be acquired by combining a plurality of methods.

(Modification 1-4)

In the above-described embodiment, one frequency threshold fth is provided; however, the number of the frequency thresholds is not limited thereto. Alternatively, a plurality of frequency thresholds fth may be provided and finer control may be performed.

(Modification 1-5)

In the above-described embodiment, as illustrated in FIG. 3, the power signal generation section 11 that generates the power signal Sp1 of the frequency fp higher than the frequency f0 is used to configure the power feeding unit 10; however, the configuration is not limited thereto. Alternatively, for example, a power signal generation section 11D that generates the power signal Sp1 of the frequency fp lower than the frequency f0 may be used to configure a power feeding unit 10D. The operation of a power receiving unit 20D in this case will be described below.

Figure 15:
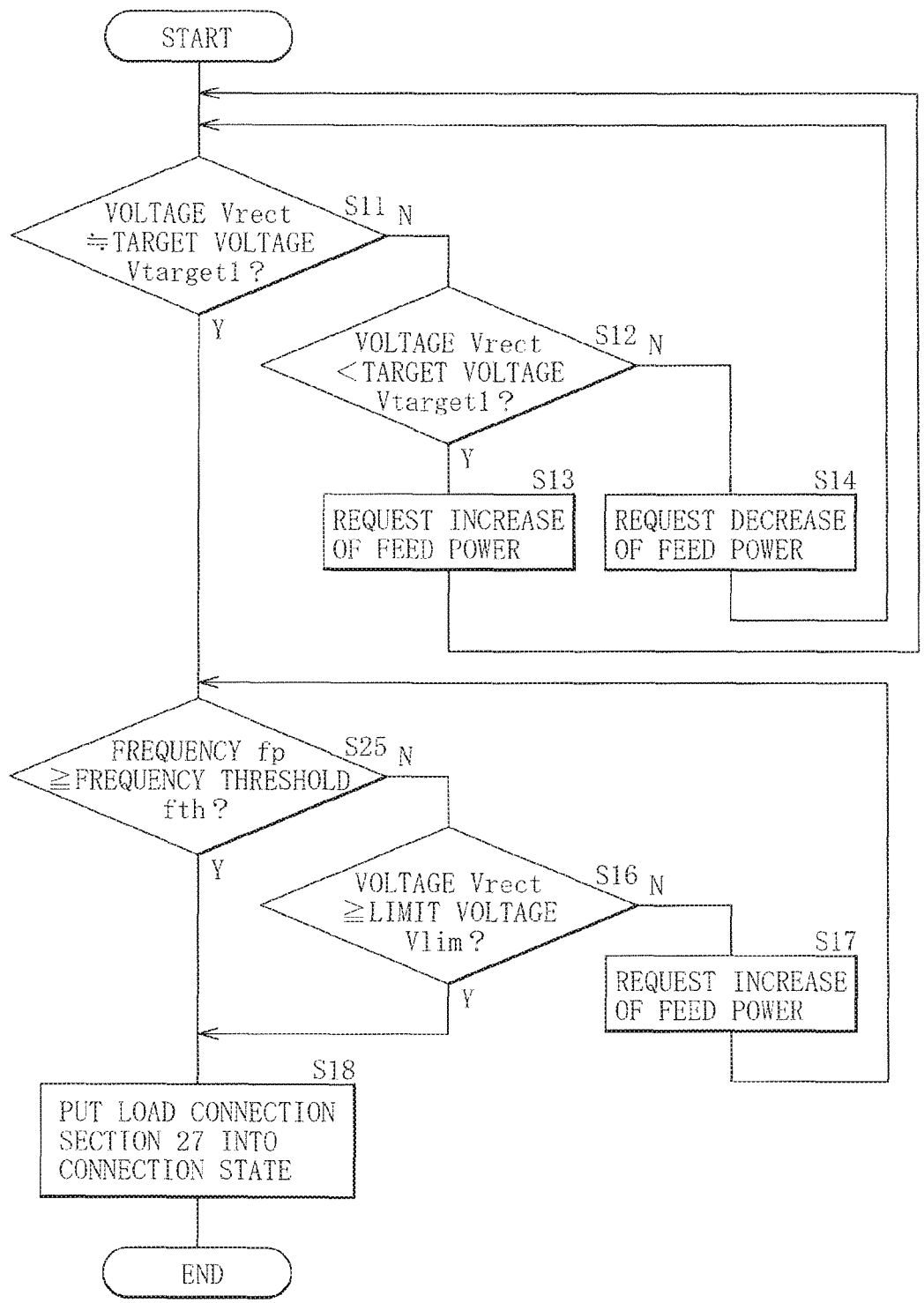
FIG. 15 is a flowchart illustrating an operation example of the power receiving unit according to still another modification of the first embodiment.

FIG. 15 is a flowchart of the operation of the power receiving unit 20D at the time of starting the power feeding. In the power receiving unit 20D, similarly to the power receiving unit 20 according to the above-described embodiment, the output voltage Vrect of the rectification circuit 25 is made close to the target voltage Vtarget1 through the steps S11 to S14. Then, when the voltage Vrect is close to the target voltage Vrarget1 at the step S11, a receiving control section 28D of the power receiving unit 20D determines whether the frequency fp of the power signal Sp2 is equal to or larger than a preset predetermined frequency threshold fth (fp≥fth) (step S25). Specifically, as illustrated in FIG. 6, it is determined whether the frequency fp of the power signal Sp2 is equal to or lower than the frequency threshold fth (fp≤fth) at the step S15 in the power receiving unit 20 according to the above-described embodiment. On the other hand, in the power receiving unit 20D according to the present modification, as illustrated in FIG. 15, it is determined whether the frequency fp of the power signal Sp2 is equal to or higher than the frequency threshold fth (fp≥fth).

Figure 16:
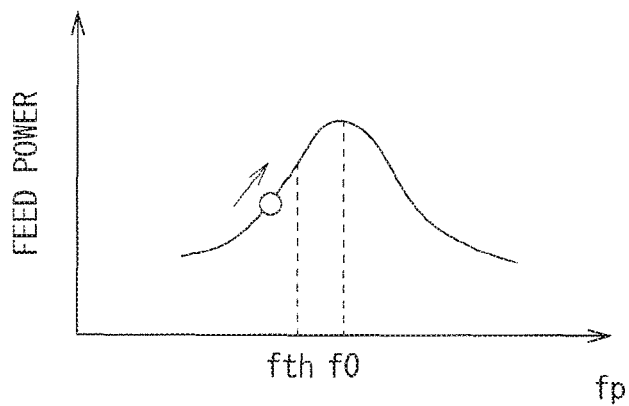
FIG. 16 is an explanatory diagram illustrating an operation example of the power receiving unit illustrated in FIG. 15.

FIG. 16 illustrates the operation of the power receiving unit 20D at the steps S25, S16, and S17. When the frequency fp is smaller than the frequency threshold fth (step S25) and the voltage Vrect is lower than the limit voltage Vlim (step S16), the power receiving unit 20D requests the power feeding unit 10D to increase the feed power (step S17). In response to the request, the feeding control section 16D of the power feeding unit 10D controls the power signal generation section 11D to increase the frequency fp of the power signal Sp1. The steps S25, S16, and S17 are repeated so that the frequency fp is gradually increased toward the frequency threshold fth as illustrated in FIG. 16 and the feed power is increased. Thus, the voltage Vrect is gradually increased toward the limit voltage Vlim. In this way, the receiving control section 28D continues to request the increase of the feed power (step S17) until the frequency fp becomes the frequency threshold fth or higher (step S25) or until the voltage Vrect becomes the limit voltage Vlim or larger (step S16).

Since the voltage Vrect immediately before the connection of the load 80 is allowed to be increased even with such a configuration, if the voltage Vrect is decreased in response to the subsequent connection of the load 80, it is possible to reduce possibility that the voltage Vrect is decreased to a voltage lower than the block voltage Vb. This makes it possible to reduce possibility of malfunction and to achieve a feed system capable of operating stably.

(Modification 1-6)

In the above-described embodiment, the power receiving unit 20 supplies the feeding control signal CTL to the power feeding unit 10; however, the configuration is not limited thereto. The power feeding unit may be configured to transmit data relating to the feeding operation to the power receiving unit. The detail of the present modification will be described in detail below.

Figure 17:
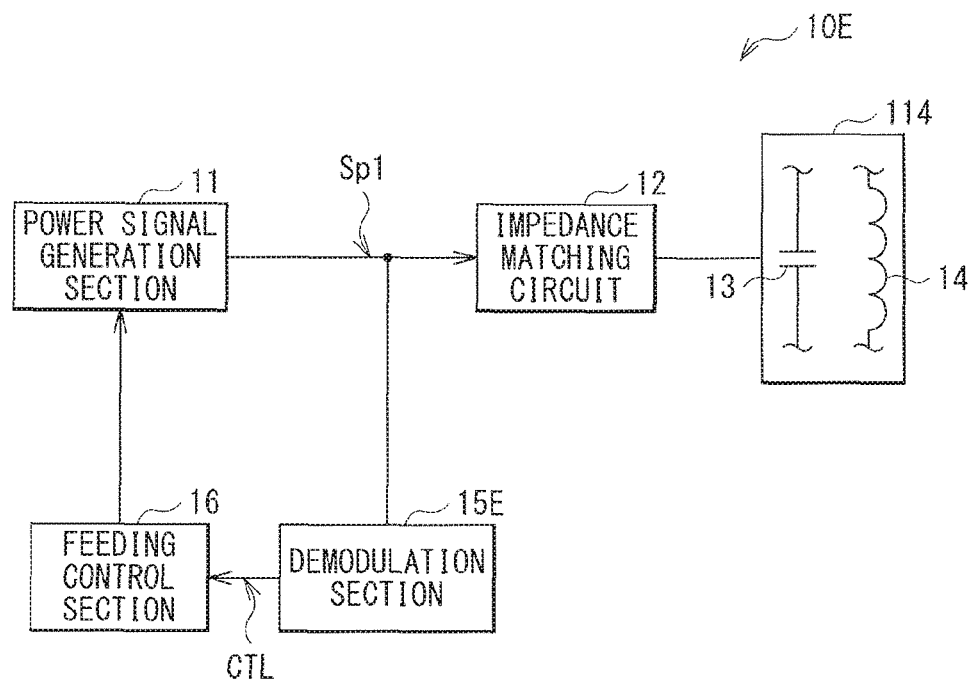
FIG. 17 is a block diagram illustrating a configuration example of a power feeding unit according to still another modification of the first embodiment.
Figure 18:
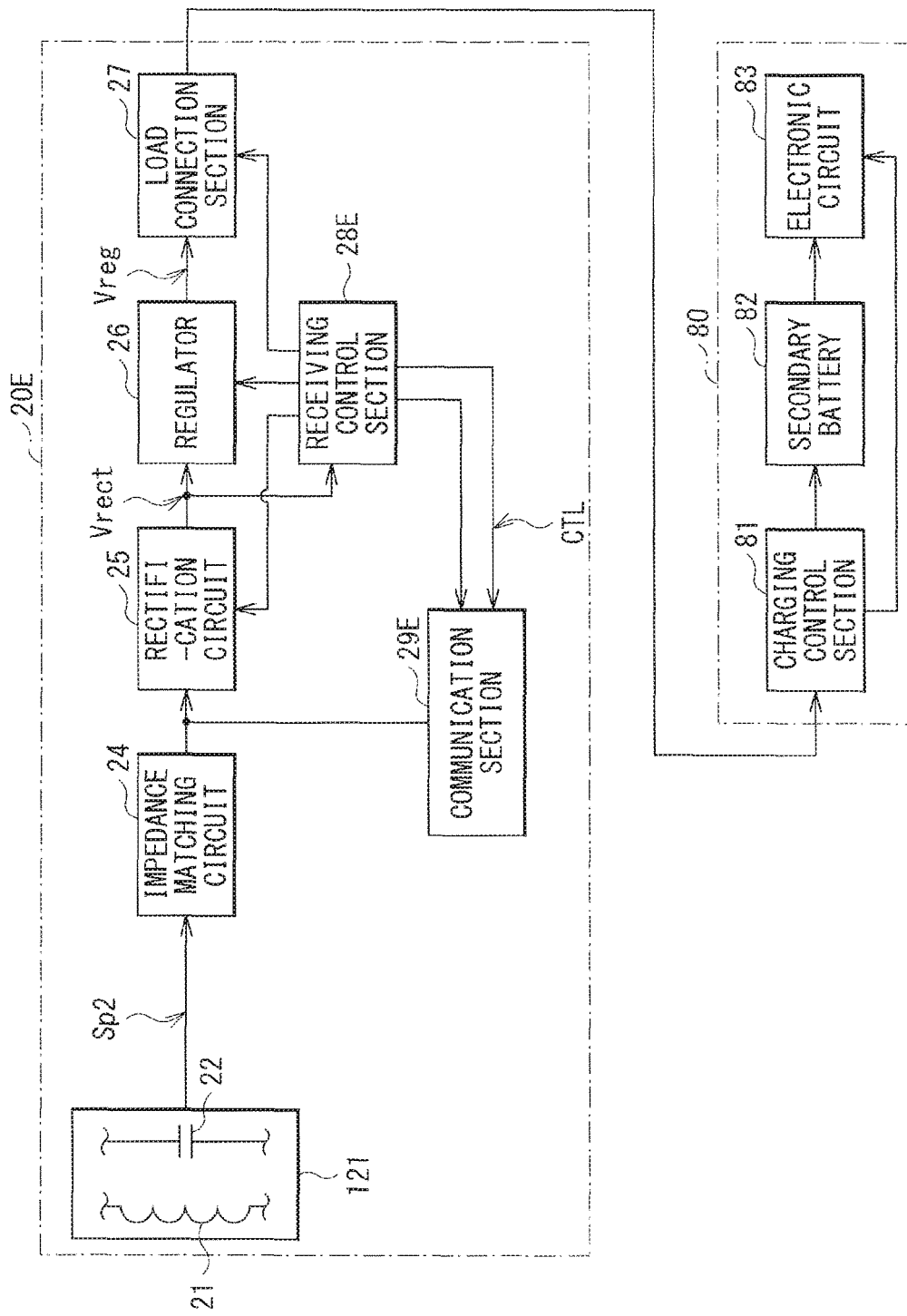
FIG. 18 is a block diagram illustrating a configuration example of a power receiving unit according to still another modification of the first embodiment.

FIG. 17 illustrates a power feeding unit 10E according to the present modification. FIG. 18 illustrates a power receiving unit 20E according to the present modification. The power feeding unit 10E includes a communication section 15E. The communication section 15E has a function of transmitting data relating to the frequency fp to the power receiving unit 20E, in addition to the function of the demodulation section 15 according to the above-described embodiment. The power receiving unit 20E has a communication section 29E and a receiving control section 28E. The communication section 29E has a function of receiving the data relating to the frequency fp from the communication section 15E of the power feeding unit 10E and notifying the receiving control section 28E of the reception result, in addition to the function of the modulation section 29 according to the above-described embodiment. The receiving control section 28E controls the operation of the power receiving unit 20E based on the output voltage Vrect of the rectification circuit 25, similarly to the receiving control section 28 according to the above-described embodiment. At that time, unlike the receiving control section 28, the receiving control section 28E acquires the frequency fp based on the notification from the communication 29E, instead of acquiring the frequency fp based on the AC voltage of the power signal Sp2. Even with such a configuration, it is possible to obtain effects similar to those in the above-described embodiment.

Incidentally, the power feeding unit 10E is provided with the communication section 15E that has both of the function of the demodulation section 15 and the function of transmitting the data relating to the frequency fp in this example; however, the configuration is not limited thereto. Alternatively, for example, the demodulation section 15 and a block transmitting the data relating to the frequency fp may be separately provided. Likewise, the power receiving unit 20E is provided with the communication section 29E that has both of the function of the modulation section 29 and the function of receiving the data relating to the frequency fp in this example; however, the configuration is not limited thereto. Alternatively, for example, the modulation section 29 and a block receiving the data relating to the frequency fp may be separately provided. Moreover, the communication section 15E and the communication section 29E may exchange data not relating to the feeding operation and the like, in addition to the data used for controlling the feeding operation.

2. Second Embodiment

Next, a feed system 2 according to a second embodiment is described. In the above-described first embodiment, the feed power is changed by changing the frequency fp of the power signal Sp1. In the second embodiment, the feed power is changed by changing voltage amplitude Ap of the power signal Sp1. Note that like numerals are used to designate substantially like components of the feed system 1 according to the above-described first embodiment, and the description thereof is appropriately omitted. As illustrated in FIG. 1, the feed system 2 includes a power feeding unit 30 and an electronic apparatus 100 including a power receiving unit 40.

As illustrated in FIG. 2, the power feeding unit 30 includes a power signal generation section 13 and a feeding control section 36. The power signal generation section 31 generates the AC power signal Sp1 based on instruction from the feeding control section 36. At this time, the power signal generation section 31 is allowed to change the voltage amplitude Ap of the power signal Sp1 based on the instruction from the feeding control section 36.

The feeding control section 36 controls feeding operation of the power feeding unit 30 based on the feeding control signal CTL. At this time, the feeding control section 36 controls the voltage amplitude Ap of the power signal Sp1 that is generated by the power signal generation section 31, to control the feed power. Specifically, for example, when increase request of the feed power is given from the power receiving unit 40, the feeding control section 36 controls the power signal generation section 31 to increase the voltage amplitude Ap of the power signal Sp1. As a result, in the feed system 2, the feed power from the power feeding unit 30 to the power receiving unit 40 is increased. Moreover, for example, when decrease request of the feed power is given from the power receiving unit 40, the feeding control section 36 controls the power signal generation section 31 to decrease the voltage amplitude Ap of the power signal Sp1. As a result, in the feed system 2, the feed power from the power feeding unit 30 to the power receiving unit 40 is decreased.

Figure 19:
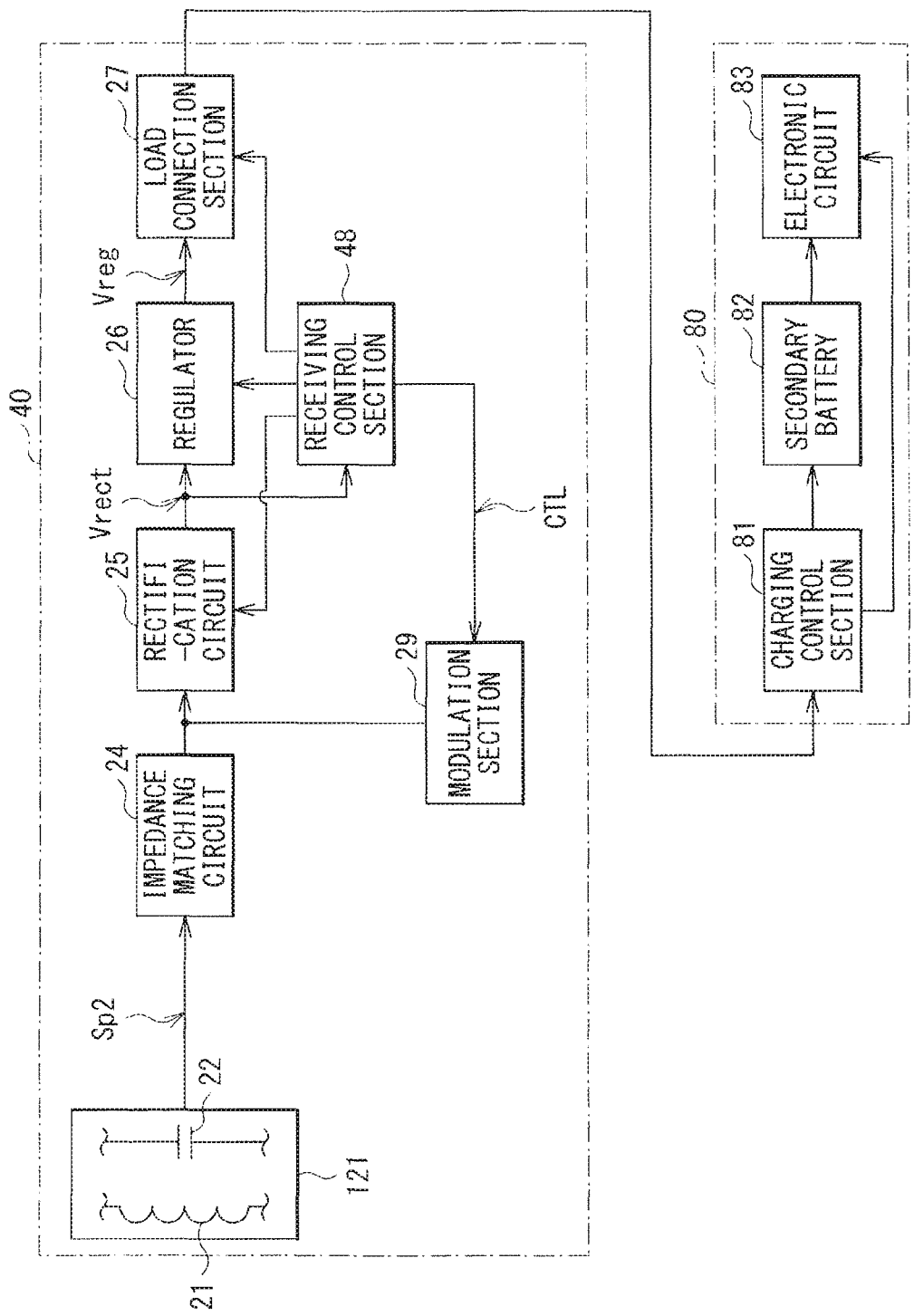
FIG. 19 is a block diagram illustrating a configuration example of a power receiving unit according to a second embodiment.

FIG. 19 illustrates a configuration example of the power receiving unit 40. The power receiving unit 40 includes a receiving control section 48. The receiving control section 48 controls operation of the power receiving unit 40 based on the output voltage Vrect of the rectification circuit 25. Specifically, the receiving control section 48 generates the feeding control signal CTL based on the output voltage Vrect of the rectification circuit 25, and controls the operation of the rectification circuit 25, the regulator 26, and the load connection section 27.

Next, the operation of the power receiving unit 40 at the time when the power feeding unit 30 starts the power feeding will be described.

Figure 20:
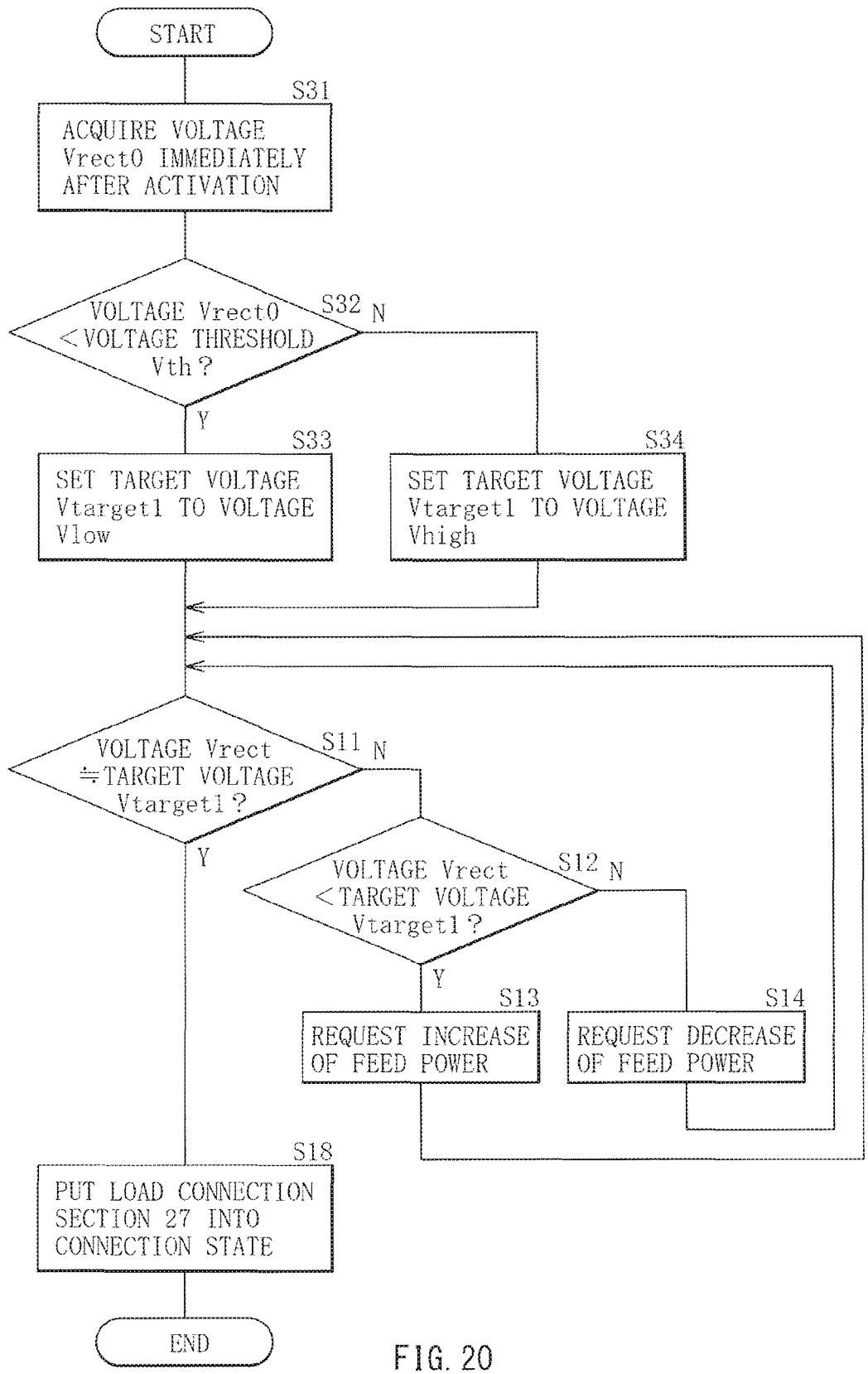
FIG. 20 is a flowchart illustrating an operation example of the power receiving unit illustrated in FIG. 19.
Figure 21:
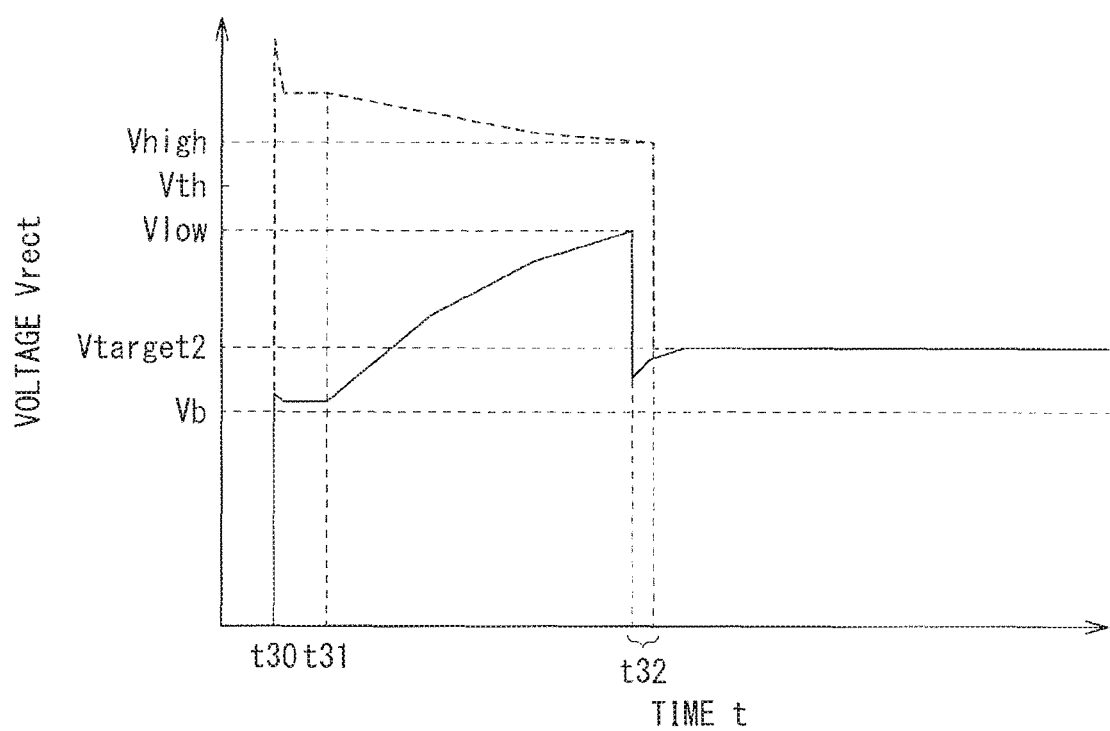
FIG. 21 is a timing waveform chart illustrating the operation example of the power receiving unit illustrated in FIG. 20.

FIG. 20 is a flowchart of the operation of the power receiving unit 40 at the time of starting the power feeding. FIG. 21 is a timing waveform chart of the output voltage Vrect of the rectification circuit 25. As illustrated in FIG. 21, when the user places the electronic apparatus 100 on the power feeding surface S1 of the power feeding unit 30 and the power feeding unit 30 starts the power feeding to the power receiving unit 40 at a timing t30, in the power receiving unit 40, the receiving control section 48 starts the operation of the rectification circuit 25 and the regulator 26 and the output voltage Vrect of the rectification circuit 25 is accordingly increased. At this time, the value of the voltage Vrect immediately after the change (immediately after the activation) is varied depending on the voltage amplitude Ap of the operation signal Sp1 in the power feeding unit 30. Specifically, immediately after the activation, for example, when the power feeding unit 30 generates the power signal Sp1 having small voltage amplitude Ap, the voltage Vrect is increased to a certain voltage as illustrated by a solid line. For example, when the power feeding unit 30 generates the power signal Sp1 having large voltage amplitude Ap, the voltage Vrect is increased to a higher voltage as illustrated by a dashed line. At this time, the load connection section 27 is still in the disconnection state. After that, the power receiving unit 40 instructs the power feeding unit 30 to increase or decrease the feed power through the feeding control signal CTL at and after a timing t31. As will be described below, when a predetermined condition is satisfied, the power receiving unit 40 starts to supply DC power to the load 80.

First, the receiving control section 48 acquires the output voltage Vrect of the rectification circuit 25 immediately after the activation, as a voltage Vrect0 (step S31), and determines whether the voltage Vrect0 is lower than the preset voltage threshold Vth (Vrect0<Vth) (step S32).

When the voltage Vrect0 is lower than the voltage threshold Vth at the step S32, the receiving control section 48 sets the target voltage Vtarget1 to a voltage Vlow (step S33). Moreover, when the voltage Vrect0 is equal to or larger than the voltage threshold Vth at the step S32, the receiving control section 48 sets the target voltage Vtarget1 to a voltage Vhigh (step S34).

Note that a voltage difference (Vhigh−Vlow) between the voltage Vhigh and the voltage Vlow is allowed to be set similarly to that in the power receiving unit 20 according to the above-described first embodiment. Specifically, for example, when the output voltage Vreg of the regulator 26 is set to 5 V and the minimum value of the target voltage Vtarget2 is set to 5.2 V, the voltage difference between the voltage Vhigh and the voltage Vlow is allowed to be, for example, 0.25 V or more. In other words, the voltage difference between the voltage Vhigh and the voltage Vlow is allowed to be 5% or more of the output voltage Vreg (for example, 5 V) of the regulator 26.

After that, in the power receiving unit 40, similarly to the power receiving unit 20 according to the first embodiment, the output voltage Vrect of the rectification circuit 25 is made close to the target voltage Vtarget1 (the voltage Vlow or the voltage Vhigh) through the steps S11 to S14. Then, when the voltage Vrect is close to the target voltage Vtarget1 at the step S11, the receiving control section 48 puts the load connection section 27 into the connection state (step S18).

In the example of FIG. 21, during the period of the timings t31 to t32, in the case where the voltage Vrect immediately after the activation is low (the solid line), the voltage Vrect is lower than the target voltage Vtarget1 (the voltage Vlow) (steps S11 and S12). Therefore, the power receiving unit 40 requests the power feeding unit 30 to increase the feed power (step S13), and the output voltage Vrect of the rectification circuit 25 is accordingly increased. Moreover, in the case where the voltage Vrect immediately after the activation is high (the dashed line), the voltage Vrect is higher than the target voltage Vtarget1 (the voltage Vhigh) (steps S11 and S12). Therefore, the power receiving unit 40 requests the power feeding unit 30 to decrease the feed power (step S14), and the output voltage Vrect of the rectification circuit 25 is accordingly decreased. Then, the voltage Vrect is gradually brought close to the target voltage Vtarget1 by repeating the steps S11, S12, and S14. Then, at the timing t32, the voltage Vrect is substantially equal to the target voltage Vtarget1, and the power receiving unit 40 starts to supply the DC power to the load 80.

In this way, the flow is ended. The power receiving unit 40 starts to supply the DC power to the load 80 through such a flow.

As described above, in the power receiving unit 40, the target voltage Vtarget1 is configured to be selectable. Therefore, it is possible to reduce possibility of malfunction, and to achieve a feed system capable of operating stably. In other words, in the power receiving unit 40, immediately after the activation, for example, when the power feeding unit 30 generates the power signal Sp1 having the large voltage amplitude Ap, the target voltage Vtarget is allowed to be set to the high voltage Vhigh. Accordingly, since the voltage Vrect is made higher than the block voltage Vb that is a voltage necessary for the operation of the power receiving unit 40 even if the voltage Vrect is decreased immediately after the load 80 is connected, the power receiving unit 40 is allowed to continue the operation. As a result, in the power receiving unit 40, it is possible to reduce possibility of malfunction, and to achieve a feed system capable of operating stably.

Moreover, in the power receiving unit 40, the target voltage Vtarget1 is configured to be selectable. Therefore, the power receiving unit 40 is allowed to receive supply of the power from any of power feeding units with various specifications, and it is possible to enhance compatibility of the power feeding units. Specifically, if the target voltage Vtarget1 is not set according to the voltage Vrect0 and is uniformly set to the high voltage Vhigh, the power feeding unit 30 that is not allowed to generate the power signal Sp1 having the large voltage amplitude Ap may not be used. This is because even if such a power receiving unit 30 sets the voltage amplitude Ap of the power signal Sp1 to a maximum, the voltage Vrect may not reach the voltage Vhigh in the power receiving unit 40. On the other hand, in the power receiving unit 40, the target voltage Vtarget1 is configured to be selectable. Therefore, when the voltage Vrect (the voltage Vrect0) immediately after the activation is low, the target voltage Vtarget1 is allowed to be set to the low voltage Vlow. As a result, the power receiving unit 40 is allowed to receive supply of the power from any of power feeding units with various specifications, and thus it is possible to enhance compatibility of the power feeding units.

As described above, in the second embodiment, the target voltage is configured to be selectable. Therefore, it is possible to reduce possibility of malfunction, and to achieve the feed system capable of operating stably. In addition, it is possible to receive supply of the power from any of power receiving units with various specifications, and thus to enhance compatibility of the power feeding units.
(Modification 2-1)

In the above-described embodiment, one of the two voltages Vlow and Vhigh is set as the target voltage Vtarget1; however, this is not limitative. One of three or more voltages may be set as the target voltage Vtarget1.
(Modification 2-2)

In the above-described embodiment, the receiving control section 48 acquires the output voltage Vrect of the rectification circuit 25; however, this is not limitative. The receiving control section 48 may further acquire the frequency fp of the power signal Sp2 similarly to the receiving control section 28 according to the above-described first embodiment. Accordingly, in addition to the power receiving unit 30 that changes the voltage amplitude Ap of the power signal Sp1 to adjust the feed power, the power feeding unit 10 that changes the frequency fp of the power signal Sp1 to adjust the feed power is allowed to be used. Therefore, the power receiving unit is allowed to receive supply of the power from any of the power receiving units with various specifications, and compatibility of the power feeding units is allowed to be enhanced. A power receiving unit 50 according to the present modification will be described in detail below.

Figure 22:
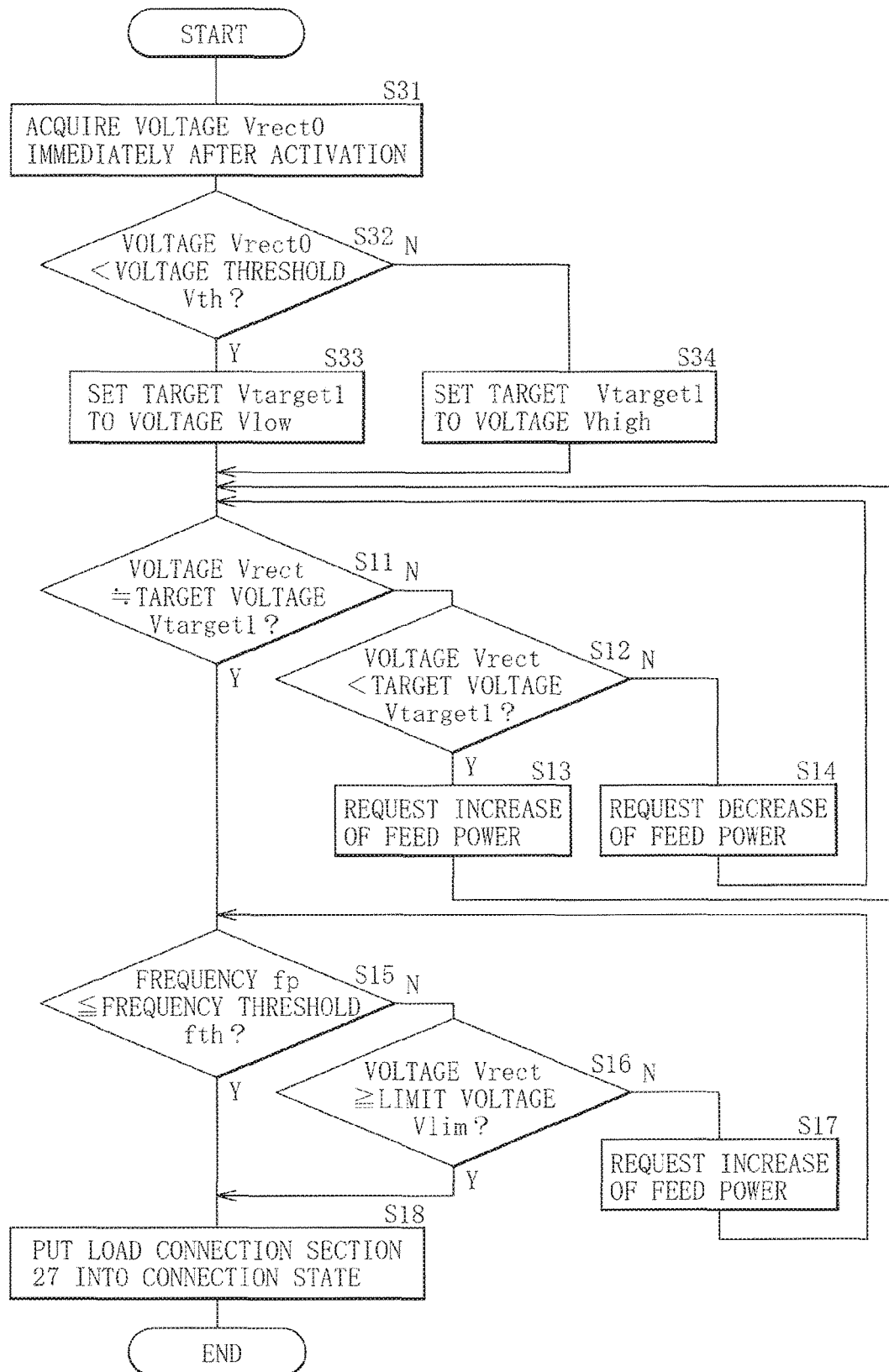
FIG. 22 is a flowchart illustrating an operation example of a power receiving unit according to a modification of the second embodiment.

FIG. 22 is a flowchart of operation of the power receiving unit 50 at the time of starting the power feeding. In the power receiving unit 50, first, similarly to the power receiving unit 40 according to the second embodiment, the target voltage Vtarget1 is set to the voltage Vlow or the voltage Vhigh based on the output voltage Vrect (the voltage Vrect0) of the rectification circuit 25 immediately after the activation through steps S31 to S34, and the output voltage Vrect of the rectification circuit 25 is made close to the target voltage Vtarget1 (the voltage Vlow or the voltage Vhigh) through the steps S11 to S14. After that, similarly to the power receiving unit 20 according to the first embodiment, the feed power is increased through the steps S15 to S17 until the frequency fp becomes the frequency threshold fth or lower or until the voltage Vrect becomes the limit voltage Vlim or larger.
(Modification 2-3)

Each of the modifications of the above-described first embodiment may be applied to the feed system 2 according to the above-described second embodiment.

Hereinbefore, although the technology has been described with referring to the embodiments and the modifications, the technology is not limited thereto, and various modifications may be made.

For example, in the above-described respective embodiments, the power receiving unit 20 or the like is applied to the electronic apparatus 90 or the like; however, this is not limitative. Alternatively, for example, the power receiving unit 20 or the like may be applied to something other than electronic apparatuses, such as electric vehicles.

Moreover, for example, in the above-described first embodiment and the like, the feed power is changed by changing the frequency fp of the power signal Sp1, and in the second embodiment, the feed power is changed by changing the voltage amplitude Ap of the power signal Sp1. However, this is not limitative. Alternatively, for example, the feed power may be changed by changing the duty ratio.

Moreover, for example, in the above-described respective embodiments, for example, the power feeding unit 10 or the like may be added with electronic circuits, electronic components, and the like other than those illustrated in FIG. 2, and the power receiving unit 20 or the like may be added with electronic circuits, electronic components, and the like other than those illustrated in FIG. 4. Specifically, for example, a display section that displays a feeding state, a receiving state, a charging state, and the like, a communication section that performs communication between the power feeding unit 10 or the like and the power receiving unit 20 or the like, a detection section that detects whether the electronic apparatus 90 etc. are disposed on the power feeding unit 10 or the like, a block that measures an electric signal relating to the power feeding unit 10 or the like and the power receiving unit 20 or the like, a block that detects a foreign matter entered between the power feeding unit 10 or the like and the power receiving unit 20 or the like, etc. may be further provided. For example, in the power receiving unit 20 or the like, a block that detects disposed position of the power feeding coil 14 of the power feeding unit 10 or the like may be provided. Accordingly, disposed position of the power feeding coil 14 that is difficult to be recognized from appearance of the power feeding unit 10 or the like is allowed to be obtained, which facilitates positioning of the power receiving coil 21 of the power receiving unit 20 or the like with respect to the power feeding coil 14 of the power feeding unit 10 or the like. Likewise, for example, in the power feeding unit 10 or the like, a block that detects disposed position of the power receiving coil 21 of the power receiving unit 20 or the like may be provided. Moreover, in the inside of the power feeding unit 10 or the like, a block that moves the power feeding coil 14 physically may be provided.

Note that the effects described in the present specification are merely examples without limitation, and other effects may be obtained.

Note that the technology may be configured as follows.

(1) A power receiving unit including:
a power generation section configured to generate DC power based on a power signal wirelessly supplied from a power feeding unit;
a load connection section configured to turn on or off supply of the DC power to a load; and
a control section configured to control feed power of the power signal, and to turn on the load connection section when the power signal satisfies a variable reference condition.

(2) The power receiving unit according to (1), wherein the control section controls the feed power based on a comparison result between a signal value of a first signal corresponding to the power signal and a variable threshold.

(3) The power receiving unit according to (2), wherein
the power signal is an AC signal,
the power generation section includes a rectification circuit configured to rectify the power signal, and
the first signal is a signal according to an output voltage of the rectification circuit.

(4) The power receiving unit according to (2), wherein
the power signal is an AC signal, and
the first signal is a signal according to amplitude of a voltage or a current of the power signal.

(5) The power receiving unit according to (3) or (4), wherein the control section detects a frequency of the power signal, and controls the feed power based on the frequency as well.

(6) The power receiving unit according to (3) or (4), further including
a communication section configured to acquire information relating to a frequency of the power signal from the power feeding unit, wherein
the control section controls the feed power based on the frequency as well.

(7) The power receiving unit according to (5) or (6), wherein
the control section sets the threshold to a first threshold, and controls the feed power to make the signal value of the first signal close to the first threshold, and
after the signal value of the first signal substantially reaches the first threshold, the control section sets the threshold to a second threshold, and
when the frequency is within a predetermined frequency range, the control section increases the feed power within the range where the signal value of the first signal does not reach the second threshold.

(8) The power receiving unit according to (7), wherein the first threshold is a value corresponding to the signal value of the first signal immediately after activation.

(9) The power receiving unit according to (7) or (8), wherein the control section turns on the load connection section when the frequency is out of the predetermined frequency range or when the signal value of the first signal reaches the second threshold.

(10) The power receiving unit according to (3) or (4), wherein the control section sets the threshold to the first threshold corresponding to the signal value of the first signal immediately after activation, and controls the feed power to make the signal value of the first signal close to the first threshold.

(11) The power receiving unit according to (10), wherein the control section turns on the load connection section when the signal value of the first signal reaches the first threshold.

(12) The power receiving unit according to any one of (1) to (11), wherein
the power generation section includes a rectification circuit configured to rectify the power signal, and
an output voltage of the rectification circuit immediately before the load connection section is turned on is varied within a range over a resolution voltage at a time when the control section controls the feed power to adjust the output voltage of the rectification circuit, based on a kind of the power feeding unit or relative arrangement between the power feeding unit and the power receiving unit during power feeding.

(13) The power receiving unit according to any one of (1) to (12), wherein
the power generation section includes a rectification circuit configured to rectify the power signal, and
an output voltage of the rectification circuit immediately before the load connection section is turned on is varied within a range over a minimum value of voltage difference between the output voltage of the rectification circuit and the voltage of the DC power after the load connection section is turned on, based on a kind of the power feeding unit or relative arrangement between the power feeding unit and the power receiving unit during power feeding.

(14) The power receiving unit according to any one of (1) to (13), wherein
the power generation section includes a rectification circuit configured to rectify the power signal, and
an output voltage of the rectification circuit immediately before the load connection section is turned on is varied within a range over 0.25 V, based on a kind of the power feeding unit or relative arrangement between the power feeding unit and the power receiving unit during power feeding.

(15) The power receiving unit according to any one of (1) to (14), wherein
the power generation section includes a rectification circuit configured to rectify the power signal, and
an output voltage of the rectification circuit immediately before the load connection section is turned on is varied within a range over 5% of a voltage of the DC power after the load connection section is turned on, based on a kind of the power feeding unit or relative arrangement between the power feeding unit and the power receiving unit during power feeding.

(16) A power receiving control method including:
generating a DC power based on a power signal wirelessly supplied from a power feeding unit; and controlling feed power of the power signal and turning on supply of the DC power to a load when the power signal satisfies a variable reference condition.

(17) A feed system provided with a power feeding unit and a power receiving unit, the power receiving unit including:
a power generation section configured to generate DC power based on a power signal wirelessly supplied from the power feeding unit;
a load connection section configured to turn on or off supply of the DC power to a load; and
a control section configured to control feed power of the power signal, and to turn on the load connection section when the power signal satisfies a variable reference condition.

(18) An electronic apparatus including:
a power generation section configured to generate DC power based on a power signal wirelessly supplied from a power feeding unit;
a load configured to operate based on the DC power;
a load connection section configured to turn on or off supply of the DC power to the load; and
a control section configured to control feed power of the power signal, and to turn on the load connection section when the power signal satisfies a variable reference condition.

It should be understood by those skilled in the art that various modifications, combinations, sub-combinations, and alterations may occur depending on design requirements and other factors insofar as they are within the scope of the appended claims or the equivalents thereof.

What is claimed is:

1. A power receiving unit comprising:
    a power generation section configured to generate DC power based on a power signal wirelessly supplied from a power feeding unit;
    a load connection section configured to turn on or off supply of the DC power to a load; and
    a control section configured to control feed power of the power signal, and to turn on the load connection section when a first signal corresponding to the DC power satisfies a reference condition, wherein
    the power signal is an AC signal, and
    the control section is configured to control the feed power based on a frequency of the power signal, or the voltage of the DC power, or a combination of the frequency of the power signal and the voltage of the DC power.

2. The power receiving unit according to claim 1, wherein the control section controls the feed power based on a comparison result between a signal value of the first signal and a threshold.

3. The power receiving unit according to claim 1, wherein the power generation section includes a rectification circuit configured to rectify the power signal, and
    the first signal is a signal according to an output voltage of the rectification circuit.

4. The power receiving unit according to claim 1, wherein the first signal is a signal according to amplitude of a voltage or a current of the power signal.

5. The power receiving unit according to claim 2, wherein the control section sets the threshold to a first threshold, and controls the feed power to make the signal value of the first signal close to the first threshold, and
    after the signal value of the first signal substantially reaches the first threshold, the control section sets the threshold to a second threshold, and when the frequency is within a predetermined frequency range, the control section increases the feed power within the range where the signal value of the first signal does not reach the second threshold.

6. The power receiving unit according to claim 5, wherein the first threshold is a value corresponding to the signal value of the first signal immediately after activation.

7. The power receiving unit according to claim 5, wherein the control section turns on the load connection section when the frequency is out of the predetermined frequency range or when the signal value of the first signal reaches the second threshold.

8. The power receiving unit according to claim 5, wherein the control section sets the threshold to the first threshold corresponding to the signal value of the first signal immediately after activation, and controls the feed power to make the signal value of the first signal close to the first threshold.

9. The power receiving unit according to claim 8, wherein the control section turns on the load connection section when the signal value of the first signal reaches the first threshold.

10. The power receiving unit according to claim 2, wherein the threshold is a variable threshold.

11. The power receiving unit according to claim 1, wherein
    the power generation section includes a rectification circuit configured to rectify the power signal, and
    an output voltage of the rectification circuit immediately before the load connection section is turned on is varied within a range over a resolution voltage at a time when the control section controls the feed power to adjust the output voltage of the rectification circuit, based on a kind of the power feeding unit or relative arrangement between the power feeding unit and the power receiving unit during power feeding.

12. The power receiving unit according to claim 1, wherein
    the power generation section includes a rectification circuit configured to rectify the power signal, and
    an output voltage of the rectification circuit immediately before the load connection section is turned on is varied within a range over a minimum value of voltage difference between the output voltage of the rectification circuit and the voltage of the DC power after the load connection section is turned on, based on a kind of the power feeding unit or relative arrangement between the power feeding unit and the power receiving unit during power feeding.

13. The power receiving unit according to claim 1, wherein
    the power generation section includes a rectification circuit configured to rectify the power signal, and
    an output voltage of the rectification circuit immediately before the load connection section is turned on is varied within a range over 0.25 V, based on a kind of the power feeding unit or relative arrangement between the power feeding unit and the power receiving unit during power feeding.

14. The power receiving unit according to claim 1, wherein
    the power generation section includes a rectification circuit configured to rectify the power signal, and
    an output voltage of the rectification circuit immediately before the load connection section is turned on is varied within a range over 5% of a voltage of the DC power after the load connection section is turned on, based on a kind of the power feeding unit or relative arrangement between the power feeding unit and the power receiving unit during power feeding.

15. The power receiving unit according to claim 1, wherein the reference condition is a variable reference condition.

16. A power receiving unit comprising:
a power generation section configured to generate DC power based on a power signal wirelessly supplied from a power feeding unit;
a load connection section configured to turn on or off supply of the DC power to a load; and
a control section configured to control feed power of the power signal, and to turn on the load connection section when a first signal corresponding to the DC power satisfies a reference condition,
wherein
the power signal is an AC signal, and
the control section controls the feed power based on a frequency of the power signal, the voltage of the DC power, or a combination of the frequency of the power signal and the voltage of the DC power.

17. A power receiving control method comprising:
generating a DC power based on a power signal wirelessly supplied from a power feeding unit;
controlling feed power of the power signal and turning on supply of the DC power to a load when a first signal corresponding to the DC power satisfies a reference condition; and
controlling the feed power based on a frequency of the power signal, the voltage of the DC power, or a combination of the frequency of the power signal and the voltage of the DC power, wherein
the power signal is an AC signal.

18. A feed system provided with a power feeding unit and a power receiving unit, the power receiving unit comprising:
a power generation section configured to generate DC power based on a power signal wirelessly supplied from the power feeding unit;
a load connection section configured to turn on or off supply of the DC power to a load; and
a control section configured to control feed power of the power signal, and to turn on the load connection section when a first signal corresponding to the DC power satisfies a reference condition, wherein
the power signal is an AC signal, and
the control section is configured to control the feed power based on a frequency of the power signal, the voltage of the DC power, or a combination of the frequency of the power signal and the voltage of the DC power.

* * * * *

UNITED STATES PATENT AND TRADEMARK OFFICE
CERTIFICATE OF CORRECTION

PATENT NO. : 10,516,300 B2  
APPLICATION NO. : 15/890754  
DATED : December 24, 2019  
INVENTOR(S) : Takashi Miyamoto Page 1 of 1

It is certified that error appears in the above-identified patent and that said Letters Patent is hereby corrected as shown below:

(*) Notice Please Add:
--This patent is subject to a terminal disclaimer--

Signed and Sealed this
Twelfth Day of May, 2020

Andrei Iancu
*Director of the United States Patent and Trademark Office*